(12) United States Patent
Bernard et al.

(10) Patent No.: US 10,854,210 B2
(45) Date of Patent: Dec. 1, 2020

(54) DEVICE AND METHOD FOR CAPTURING AND PROCESSING A THREE-DIMENSIONAL ACOUSTIC FIELD

(71) Applicant: Coronal Audio S.A.S., Lyons (FR)

(72) Inventors: Benjamin Bernard, Monaco (MC); Francois Becker, Massy (FR)

(73) Assignee: Coronal Audio S.A.S., Lyons (FR)

( * ) Notice: Subject to any disclaimer, the term of this patent is extended or adjusted under 35 U.S.C. 154(b) by 0 days.

(21) Appl. No.: 16/286,854

(22) PCT Filed: Sep. 13, 2017

(86) PCT No.: PCT/EP2017/025255
§ 371 (c)(1),
(2) Date: May 30, 2019

(87) PCT Pub. No.: WO2018/050292
PCT Pub. Date: Mar. 22, 2018

(65) Prior Publication Data
US 2020/0143815 A1    May 7, 2020

(30) Foreign Application Priority Data

Sep. 16, 2016   (MC) .......................................... 2622

(51) Int. Cl.
H04R 5/00        (2006.01)
G10L 19/008    (2013.01)
(Continued)

(52) U.S. Cl.
CPC ............ G10L 19/008 (2013.01); H04R 1/406 (2013.01); H04R 3/005 (2013.01); H04R 5/027 (2013.01);
(Continued)

(58) Field of Classification Search
CPC ......... G10L 19/008; H04R 1/32; H04R 1/326; H04R 1/342; H04R 1/40; H04R 1/406;
(Continued)

(56) References Cited

U.S. PATENT DOCUMENTS

| 3,632,886 A | 1/1972 | Scheiber |
| 4,334,740 A * | 6/1982 | Wray ..................... G03B 31/00 352/11 |

(Continued)

FOREIGN PATENT DOCUMENTS

| EP | 2285139 | 2/2011 |
| EP | 2346028 | 7/2011 |

(Continued)

OTHER PUBLICATIONS

IPRP with International Search Report and Written Opinion dated Mar. 30, 2019, for PCT Application No. PCT/EP2017/025255 19 Pages.

(Continued)

*Primary Examiner* — Leshui Zhang
(74) *Attorney, Agent, or Firm* — Womble Bond Dickinson (US) LLP

(57) ABSTRACT

Capturing, encoding and transcoding an acoustic field, such as a three-dimensional acoustic field, comprising a device made up of two microphones, directional analysis and encoding means of said acoustic field, and optionally means for transcoding said acoustic field.

14 Claims, 16 Drawing Sheets

(51) Int. Cl.
*H04R 1/40* (2006.01)
*H04R 3/00* (2006.01)
*H04R 5/027* (2006.01)
*H04R 29/00* (2006.01)
*H04S 3/00* (2006.01)

(52) U.S. Cl.
CPC .......... *H04R 29/005* (2013.01); *H04S 3/008* (2013.01); *H04S 2400/01* (2013.01); *H04S 2400/15* (2013.01)

(58) Field of Classification Search
CPC . H04R 3/00; H04R 3/005; H04R 3/10; H04R 5/027; H04R 29/004; H04R 29/005; H04R 29/006; H04S 3/008; H04S 3/02; H04S 2400/01; H04S 2400/15
USPC .... 381/1, 23, 22, 20, 19, 21, 26, 56, 60, 91, 381/92, 95, 111, 112, 113, 114, 115, 122, 381/355, 356, 357, 358, 369; 700/94
See application file for complete search history.

(56) References Cited

U.S. PATENT DOCUMENTS

| | | | |
|---|---|---|---|
| 4,696,036 A | 9/1987 | Julstrom | |
| 4,862,502 A | 8/1989 | Griesinger | |
| 5,136,650 A | 8/1992 | Griesinger | |
| 5,664,021 A * | 9/1997 | Chu | H04R 1/406 379/202.01 |
| 6,041,127 A * | 3/2000 | Elko | H04R 3/005 381/66 |
| 6,430,293 B1 | 8/2002 | Finsterle | |
| 6,507,659 B1 * | 1/2003 | Iredale | H04R 3/005 381/111 |
| 8,170,260 B2 * | 5/2012 | Reining | H04R 5/027 381/122 |
| 8,712,061 B2 * | 4/2014 | Jot | H04S 3/02 381/17 |
| 2002/0009203 A1 * | 1/2002 | Erten | H04R 1/406 381/92 |
| 2002/0037086 A1 * | 3/2002 | Irwan | H04S 3/00 381/307 |
| 2003/0142836 A1 * | 7/2003 | Warren | H04R 25/407 381/92 |
| 2004/0013038 A1 * | 1/2004 | Kajala | G01S 3/043 367/119 |
| 2006/0222187 A1 * | 10/2006 | Jarrett | H04R 3/002 381/92 |
| 2007/0237340 A1 * | 10/2007 | Pfanzagl-Cardone | H04R 1/406 381/92 |
| 2008/0063224 A1 * | 3/2008 | De Klerk | H04R 1/227 381/304 |
| 2008/0200567 A1 | 8/2008 | Schilling et al. | |
| 2008/0205676 A1 * | 8/2008 | Merimaa | G10L 19/008 381/310 |
| 2008/0219485 A1 * | 9/2008 | Kantola | H04R 3/005 381/303 |
| 2009/0175466 A1 * | 7/2009 | Elko | H04R 3/005 381/94.2 |
| 2010/0142732 A1 * | 6/2010 | Craven | H04S 3/00 381/170 |
| 2010/0329466 A1 * | 12/2010 | Berge | H04R 3/12 381/22 |
| 2011/0249822 A1 * | 10/2011 | Jaillet | G10L 19/008 381/22 |
| 2012/0288114 A1 * | 11/2012 | Duraiswami | H04R 1/406 381/92 |
| 2013/0016842 A1 * | 1/2013 | Schultz-Amling | G10L 19/173 381/17 |
| 2014/0219460 A1 * | 8/2014 | McGrath | H04S 3/02 381/23 |
| 2014/0219471 A1 * | 8/2014 | Deshpande | H04R 3/005 381/92 |
| 2015/0281833 A1 * | 10/2015 | Shigenaga | H04R 3/005 381/92 |
| 2016/0088392 A1 * | 3/2016 | Huttunen | H04R 1/326 381/92 |
| 2017/0034616 A1 * | 2/2017 | Yoshino | H04R 1/326 |
| 2019/0373362 A1 * | 12/2019 | Ansai | H04R 3/005 |

FOREIGN PATENT DOCUMENTS

| | | |
|---|---|---|
| FR | 2908586 | 5/2008 |
| WO | 0207481 | 1/2002 |
| WO | 2009046223 | 4/2009 |
| WO | 2009046460 | 4/2009 |
| WO | 2010076460 | 7/2010 |
| WO | 2014076430 | 5/2014 |

OTHER PUBLICATIONS

MPEG-H Audio—The New Standard for Universal Spatial / 3D Audio Coding, by J Herre, J Hilpert, A Kuntz & J Plogsties J. Audio Eng. Soc., vol. 62, No. 12, Dec. (AES 2014) pp. 821-830.

"Directional Audio Coding in Spatial Reproduction and Stereo Upmixing" by Ville Pulkki; Directional Audio Coding in Spatial Sound (Audio Engineering Society, 2006) 8 pages.

"Acoustic intensity in multichannel rendering systems" by Antoine Hurtado-Huyssen and Jean-Dominique Polack; Audio Engineering Society (AES, 2005) 8 pages.

"Expanded three-channel mid/side coding for three-dimensional multichannel audio systems" by Shi Dong, Ruimin Hu*, Xiaochen Wang, Yuhong Yang and Weiping Tu; EURASIP Journal on Audio, Speech, and Music Processing (EURASIP 2014) 13 pages.

"A general compression approach to multi-channel three-dimensional audio" by Bin Cheng, Christian Ritz, Ian Burnett, and Xiguang Zheng; IEEE Transactions on Audio, Speech, and Language Processing, Vol. 21, No. 8, Aug. 2013 (IEEE 2013) pp. 1676-1688.

International Search Report and Written Opinion for Application No. PCT/EP2017/025274 dated Mar. 9, 2018

Communication Concerning Correction of Deficiencies in Written Opinion/Amendment of Application for European Application No. 17787331.2 dated Feb. 12, 2019.

Balan, R., et al., "Statistical Properties of STFT Ratios for Two Channel Systems and Applications to Clind Source Separation," Proc. ICA-BSS, 2000.

Gerzon, Michael, "Whither Four Channels?", Audio Annual 1971, 12 pages.

Gerzon, Michael A., "A Geometric Model for Two-Channel Four-Speaker Matrix Stereo Systems," Journal of the Audio Engineering Society, vol. 23, No. 2, Mar. 1975, pp. 98-106.

Maher, Robert C., "Evaluation of a Method for Separating Digitized Duet Signals," J. Audio Eng. Soc., vol. 38, No. 12, Dec. 1990, pp. 956-979.

Scheiber, Peter, "Analyzing Phase-Amplitude Matrices," Journal of the Audio Enginerring Society, vol. 19, No. 10, Nov. 1971, pp. 835-839.

Sommerwerck, William, et al. "The Threat of Dolby Surround," MultiChannelSound, vol. 1, Nos. 4 & 5, Oct.-Nov. 1986, 5 pages.

Trevino, Jorge, et al., "A Spatial Extrapolation Method to Derive High-Order Ambisonics Data from Stereo Sources," Journal of Information Hiding and Multimedia Signal Processing, vol. 6, No. 6, Nov. 2015, pp. 1100-1116.

Trevino, Jorge, et al., "Enhancing Stereo Signals with High-Order Ambisonics Spatial Information," IEICE Trans. Inf. & Syst., vol. E99-D, No. 1, Jan. 2016, pp. 41-49.

Papoulis, Athanasios, "Signal Analysis," McGraw Hill, 1977, pp. 174-178.

Merimaa, Juha, "Analysis, synthesis, and perception of spatial sound: Binaural localization modeling and multichannel loudspeaker reproduction", Helsinki University of Technology, Doctoral Dissertation, Aug. 11, 2006, 196 pages.

(56) References Cited

OTHER PUBLICATIONS

Vennerod, Jakob, "Binaural Reproduction of Higher Order Ambisonics", Electronics System Design and Innovation, Jun. 2014, 113 pages.
Julstrom, Stephen, "A High-Performance Surround Sound Process for Home Video", Journal of AES, vol. 35, No. 7/8, Jul./Aug. 1987, pp. 536-549.
Pulkki, Ville, "Spatial Sound Reproduction with Directional Audio Coding", J. Audio Eng. Soc., vol. 55, No. 6, Jun. 2007, pp. 503-516.
Pulkki, Ville, "Directional audio coding in spatial sound reproduction and stereo upmixing", AES 28th International Conference: The Future of Audio Technology—Surround and Beyond, Jun. 2006, pp. 1-8.
International Search Report and Written Opinion for Application No. PCT/EP2017/025255 dated Nov. 24, 2017.
International Preliminary Report on Patentability for International Application No. PCT/EP2017/025274 dated Apr. 11, 2019, 14 pages.
Article 94(3) EPC for European Application No. 17787331.2 dated Jan. 27, 2020, 13 pages.

\* cited by examiner

DEVICE AND METHOD FOR CAPTURING AND PROCESSING A THREE-DIMENSIONAL ACOUSTIC FIELD

This patent application is a national phase entry of PCT application PCT/EP2017/025255 filed Sep. 13, 2017, which claims the benefit of the earlier filing date of Monaco patent application 2622, filed Sep. 16, 2017.

FIELD

The present invention relates to a device and method for capturing, encoding and transcoding an acoustic field, more particularly a three-dimensional acoustic field, comprising a device made up of two non-coinciding microphones, directional analysis and encoding means, and optionally means for transcoding said acoustic field.

BACKGROUND

In the present document, three-dimensional sound capture is defined as the ability to obtain perceptual information on the acoustic field at a measurement point so as to be able to reproduce it in the context of immersive listening. The analyzed data is the acoustic content as well as the location of the sound sources.

There are four major categories of three-dimensional sound capture systems:
  systems having at least 3 microphone buttons without processing or linear matrix processing for sound capture directly in a multichannel listening format with at least 3 channels or surround matrix with two channels; these look like trees or TV antennas (for example the widely used arrangements such as double-MS, Decca Tree, OCT Surround, IRT Cross or Hamasaki Square);
  "array" systems with 3 or more microphone buttons, with nonlinear processing making it possible to obtain an intermediate format or a listening format; these, for example RondoMic, Nokia OZO, or the systems called "acoustic cameras", are polymorphous: linear, square, tree shaped, spherical, cylindrical. One example is provided in US2016088392;
  systems with spatial harmonics of the first order or a higher order, having at least 4 buttons, making it possible to obtain an A-Format or B-Format intermediate multichannel format with 4 or more channels by mastering or synthesis of microphone lobes; these systems, for example microphones of the Soundfield, Sennheiser Ambeo or Eigenmike type, generally offer a smaller bulk than the previous systems;
  binaural recording systems, with two or more buttons, that reproduce the physical phenomena taking place around a listener's head, making it possible to obtain a signal with two channels containing psychoacoustic indicators of periphonic location. These systems have the drawback of not being perfectly suited to the physical characteristics of the end listener (separation of the ears, head shapes, etc.) as well as not allowing the listener's head to rotate without the acoustic field turning accordingly, which greatly limits their use aside from a sound pickup with fixed orientation. These systems include Kemar, Neumann KU-100, 3Dio, Free Space artificial heads, and many other models of intra-auricular microphones.

There are also many other devices with two microphones allowing a two-dimensional stereophonic capture and/or reproduction, such as pairs of microphones according to A-B, X-Y, MS or ORTF arrangements, or the dual-channel device described in U.S. Pat. No. 6,430,293. These devices only allow the capture of a two-dimensional projection of the three-dimensional acoustic space in a plane, most often in a half-plane like in the case of U.S. Pat. No. 6,430,293.

Several methods for directional analysis of an acoustic field are known, using various approaches. For example, U.S. Pat. No. 8,170,260 describes a method based on a capture by spherical harmonics with four buttons. The binaural cue coding method described in "Binaural cue coding: a novel and efficient representation of spatial audio" (IEEE: 2002) allows the simultaneous transmission of a monophonic reduction of several sound sources and direction information in time and in frequency, but it is limited to separate monophonic sources whose directions are known a priori, and therefore does not apply to the capture of any acoustic field. "Acoustic intensity in multichannel rendering systems" (AES, 2005) describes an intensimetric analysis method for a planar surround acoustic field, an implementation of which is described in FR2908586. The DirAC method described in "Directional Audio Coding in Spatial Reproduction and Stereo Upmixing" (Audio Engineering Society, 2006) makes it possible, from a B-format field represented by four spherical harmonics, to separate said field into diffuse and non-diffuse parts, to determine the variation over time of the direction of origin of the non-diffuse part, and to re-synthesize the field from a monophonic reduction and direction of origin information, through any diffusion arrangement. The HARPEX method, described in EP2285139, improves the DirAC method by making it possible, for each frequency, to manage two plane waves having different directions. U.S. Pat. No. 6,507,659 proposes a method for capturing a planar surround field using at least three microphone buttons. US20060222187 describes a method for capturing the hemispherical acoustic field using three coinciding microphones, according to a double-MS arrangement. All of these methods have the drawback of requiring a capture of the acoustic field over at least three channels, or four channels for some methods.

Other methods for parametric coding of a three-dimensional field are also known, for example the HOA encoding block present in standard MPEG-H described in "MPEG-H Audio—The New Standard for Universal Spatial/3D Audio Coding" (AES 2014), "Expanded three-channel mid/side coding for three-dimensional multichannel audio systems" (EURASIP 2014), which allows coding on three channels, or "A general compression approach to multi-channel three-dimensional audio" (IEEE 2013), which proposes three-dimensional coding on two stereophonic channels, from a capture with at least four channels.

All of these methods have either the drawback of requiring a capture of the field on at least three channels, or the drawback of a coding and transmission on at least three channels, or both of the aforementioned drawbacks at once.

SUMMARY

The aim of the present invention is to overcome the aforementioned drawbacks in the state of the art.

In the context of the present invention, a new system is described not falling within the four categories of three-dimensional field capture methods cited above. The invention uses only two microphone buttons and the appropriate processing means, and makes it possible to obtain a variety of coding of the signals reproducing the two-dimensional (called "surround") or three-dimensional (called "periphonic") acoustic field, suitable for immersive listening. The system operates in the frequency domain, by analyzing the sound signal over successive time windows, in the frequency domain. In each time window, for each frequency or each frequency band among a plurality of frequencies, it is assumed that one and only one monochromatic progressive plane wave passes through the device with a propagation direction, a magnitude and phase, and a frequency centered on the considered frequency band. This reductive approach is sufficient for a subjective capture, i.e., at a given point in space. The device analyzes the characteristics of these waves: spatial origin, magnitude, phase, and allows, from this information, transcoding toward a plurality of spatial encodings of the sound signal. One of the substantial advantages of the present invention is that it facilitates the transmission and storage of a three-dimensional field, since these two operations are systematically done on only two channels. A large majority of the processing and assembly, transmission, compression and storage chains are particularly suitable for a format with two channels, due to the historical preponderance of the stereophonic format.

The present invention therefore has many advantages relative to the state of the art, in that it:

- allows a surround or 3D capture using only two buttons, therefore with a reduced bulk and cost, and whose device can advantageously be placed on board mobile devices;
- makes it possible to capture a field using only two channels, and to transcode it a posteriori, in particular binaurally, without the physical characteristics and the orientation of the head being set a priori;
- is usable on any digital audio recording or editing equipment accepting stereophonic content;
- makes it possible to apply the processing for detecting directions, magnitude and phase at several levels of the audio content production chain, for example upon capture, but also before or after editing, or during final broadcasting.

DETAILED DESCRIPTION

A direct orthonormal three-dimensional Cartesian coordinate system is used with axes (X Y, Z) and coordinates (x, y, z).

The azimuth is considered to be the angle in the plane (z=0), from the axis X toward the axis Y (trigonometric direction), in radians. A vector v will have an azimuth coordinate a when the half-plane (x=0, y≥0) having undergone a rotation around the axis Z by an angle a will contain the vector v.

A vector v will have an elevation coordinate e when, in the half-plane (y=0, x≥0) having undergone a rotation around the axis Z, it has an angle e with a non-nil vector of the half-line defined by intersection between the half-plane and the horizontal plane (z=0), positive toward the top.

The unit vector with azimuth and elevation a and e will have, as Cartesian coordinates:

$$\begin{cases} x = \cos(a)\cos(e) \\ y = \sin(a)\cos(e) \\ z = \sin(e) \end{cases} \quad (1)$$

The capture of the acoustic field can be done in three dimensions using any implementation of the present invention, and transcoded into a format that preserves the information of the three dimensions (periphonic case). It may also be transcoded into a format that does not keep the third dimension: for example by not taking the elevation into account, or using it as divergence parameter, by causing the divergence to evolve for example as the cosine of the elevation.

Certain implementations of the invention use microphone buttons with cardioid directivity. These are acoustic sensors that measure the pressure gradient, and having the particularity of having a favored capture direction of the sound and an opposite rejection direction of the sound, i.e., in the listening axis of the microphone, the sound is captured with a maximum volume, and behind the microphone, the sound is ideally no longer audible. For such a microphone, the theoretical gain depending on the non-oriented angle θ between the direction of origin of the sound and the main axis of the microphone is written as follows:

$$g(\theta) = \frac{1}{2}(1+\cos(\theta)) \quad (2)$$

According to a vectorial formulation, a cardioid microphone oriented toward the unitary vector v$_m$ (i.e., of maximum gain for the waves coming from the direction v$_m$) perceives a sinusoidal progressive plane wave coming from a unitary vector v$_s$ with the following theoretical gain:

$$g_m(v_s) = \frac{1}{2}(1+v_m \cdot v_s) \quad (3)$$

where v$_m$·v$_s$ designates the scalar product of the vectors v$_m$ and v$_s$.

Figure 1:
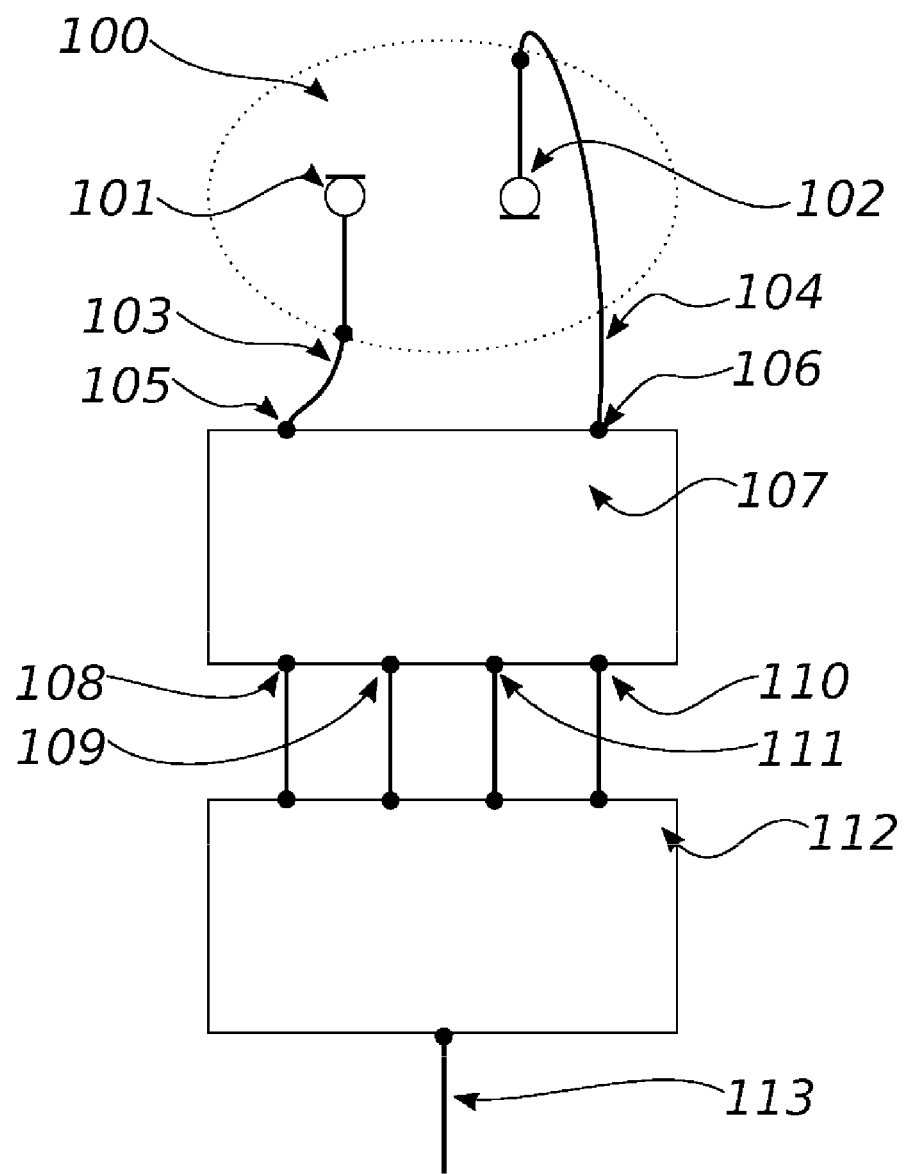
FIG. 1 shows a general form of the invention comprising a sound acquisition device (100) according to any one of the implementations of the invention, made up of two microphones $M_1$ (101) and $M_2$ (102) arranged in an acoustic field, said microphones each having an output signal (103, 104). Said output signals are provided to the two inputs (105, 106) of a stage (107) for detecting direction of origin (108, 109) and calculating magnitude (110) and phase (111) of the incident wave. The information 108 to 111 is provided to a stage (112) for transcoding in any standard audio format (113).
Figure 2:
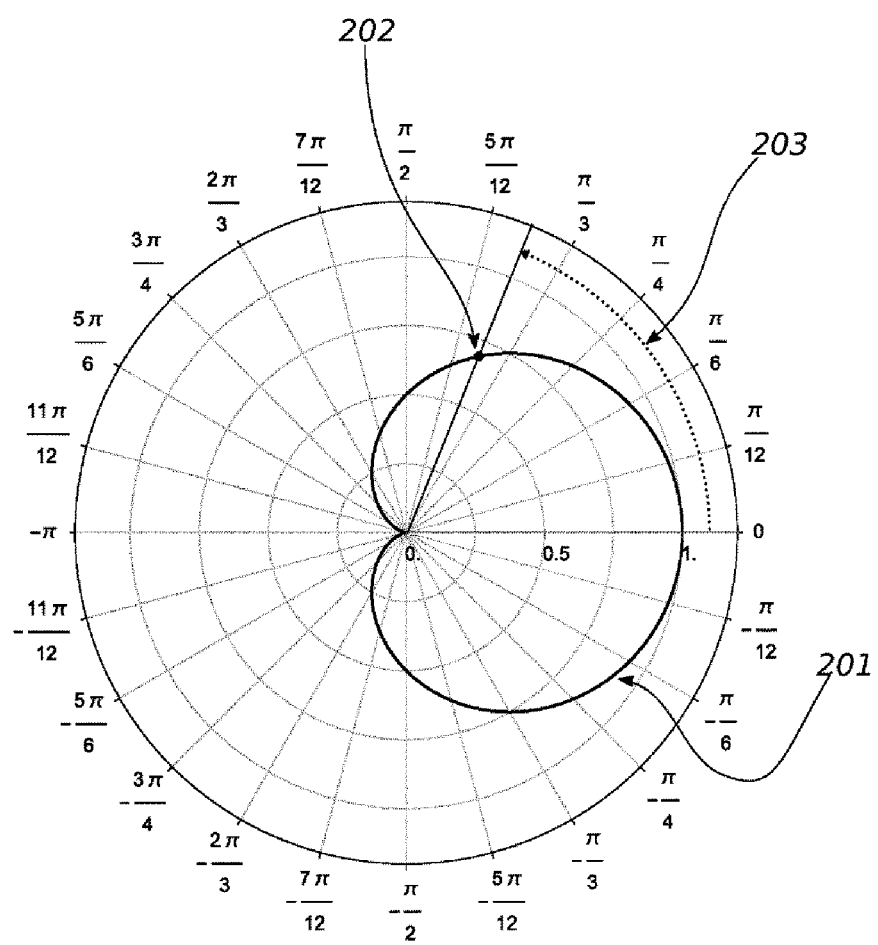
FIG. 2 shows the ideal directivity (201) of a cardioid microphone, or the normalized output gain (202) as a function of the angle of incidence (203) of a plane wave. A unitary gain is obtained for a plane wave with direction of origin combined with the viewing direction of said microphone, and a nil gain is obtained for a direction of origin opposite the viewing direction.

FIG. 2 shows the behavior of the gain of a cardioid microphone as a function of the angle presented by the source with respect to the direction toward which the microphone is oriented. The term "cardioid" comes from the shape of this figure.

The commercially available cardioid microphones do not ideally follow the angular gain function; among their defects, one can see that:
  there is a deviation over the entire function,
  the gain for θ=π is not canceled out ("wide cardioid" or "subcardioid" case) or is canceled out at angles close to π and assumes negative values ("hypercardioid" case), or it has several lobes,
  the defects depend on the frequency,
  the defects vary from one microphone to another, for a same model.

It will be necessary to take some of these defects into account during the implementation of the device.

Figure 3:
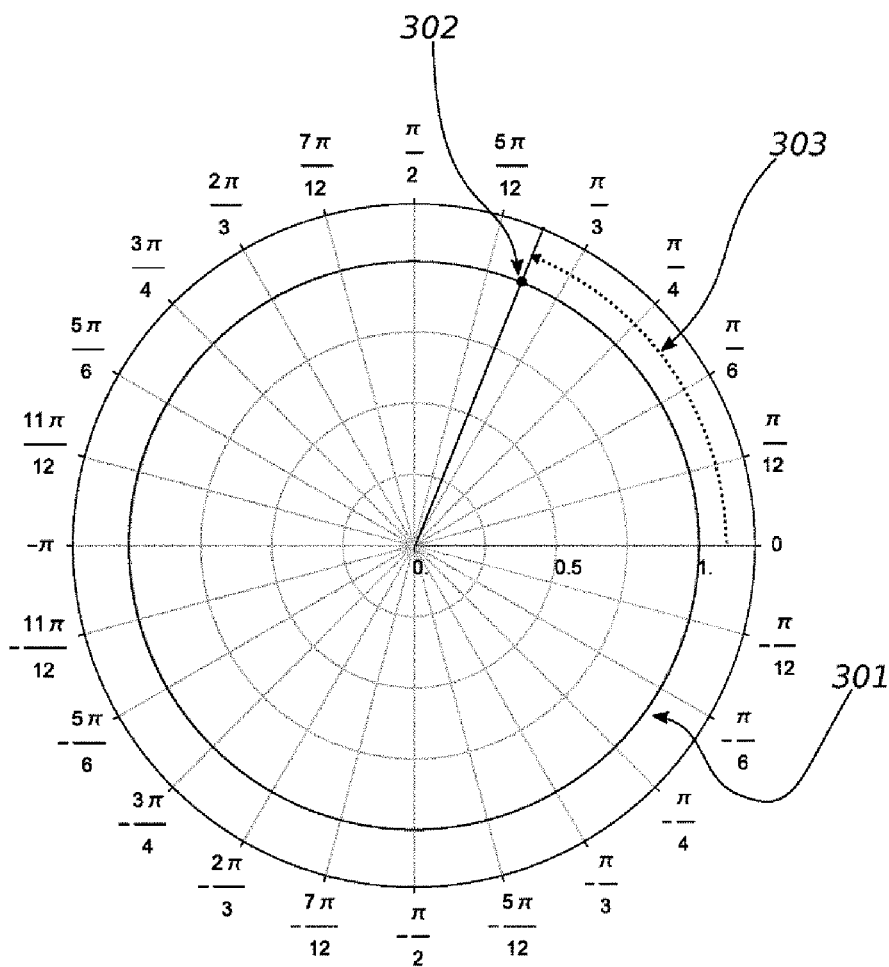
FIG. 3 shows the ideal directivity (301) of an omnidirectional microphone, or the normalized output gain (302) as a function of the angle of incidence (303) of a plane wave. A unitary gain is obtained for a plane wave irrespective of the direction of origin of the wave.
Figure 4:
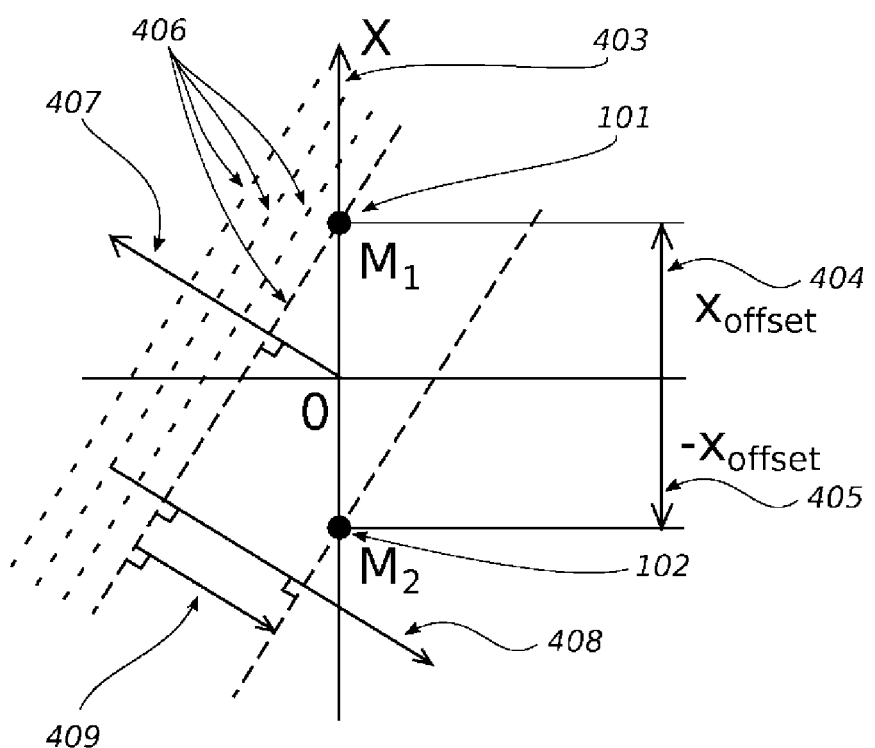
FIG. 4 illustrates, in the plane, the difference in path between two microphones whose buttons do not coincide. The two microphones $M_1$ (101) and $M_2$ (102) are positioned in space along the X-axis (403) at abscissa $x_{offset}$ (404) and $-x_{offset}$ (405). A monochromatic plane wave, several wave fronts (406) of which are shown, has a direction of origin (407) determined by an azimuth and an elevation, and its oriented propagation axis (408) by definition has a direction opposite its direction of origin. The difference in path (409) is then defined as the length of the projection of the vector $M_1M_2$ (101 102) on the oriented propagation axis (408).

Some implementations of the invention use a microphone button with omnidirectional directivity. These are acoustic sensors that measure the pressure at a given point in space. Ideally, they do not have a favored orientation, i.e., the gain applied to an acoustic wave is independent of its propagation direction. This behavior is shown in FIG. 3 as a function of the angle of incidence of the wave relative to the main oriented angle of the sensor.

These buttons also have deviations between their theoretical behavior and their actual behavior, namely a directional tendency in the high frequencies caused by an acoustic shadow phenomenon.

According to certain implementations of the invention, it is possible, for each frequency among a plurality of frequencies, to measure the value called panorama. Let there be two microphones M$_1$ and M$_2$ each capturing an acoustic signal. It is considered that these microphones do not introduce a phase or phase inversion into the capture of the signals.

In the context of the present invention, the panorama of the two acoustic signals is defined as the ratio of the difference of the magnitudes perceived by the two mics divided by their sum:

$$\text{Panorama}_{M_1,M_2}(a, e) = \frac{|sg_{M_1}(a, e)| - |sg_{M_2}(a, e)|}{|sg_{M_1}(a, e)| + |sg_{M_2}(a, e)|} \quad (4)$$

where s is a complex coefficient of magnitude equal to the amplitude of the wave, and phase equal to the phase of the wave, for example at the center of the device. This panorama is therefore independent of the magnitude and the phase of the signal s, and depends solely on its azimuth and its elevation, as well as the orientation of the microphones:

$$\text{Panorama}_{M_1,M_2}(a, e) = \frac{|g_{M_1}(a, e)| - |g_{M_2}(a, e)|}{|g_{M_1}(a, e)| + |g_{M_2}(a, e)|} \quad (5)$$

Figure 7:
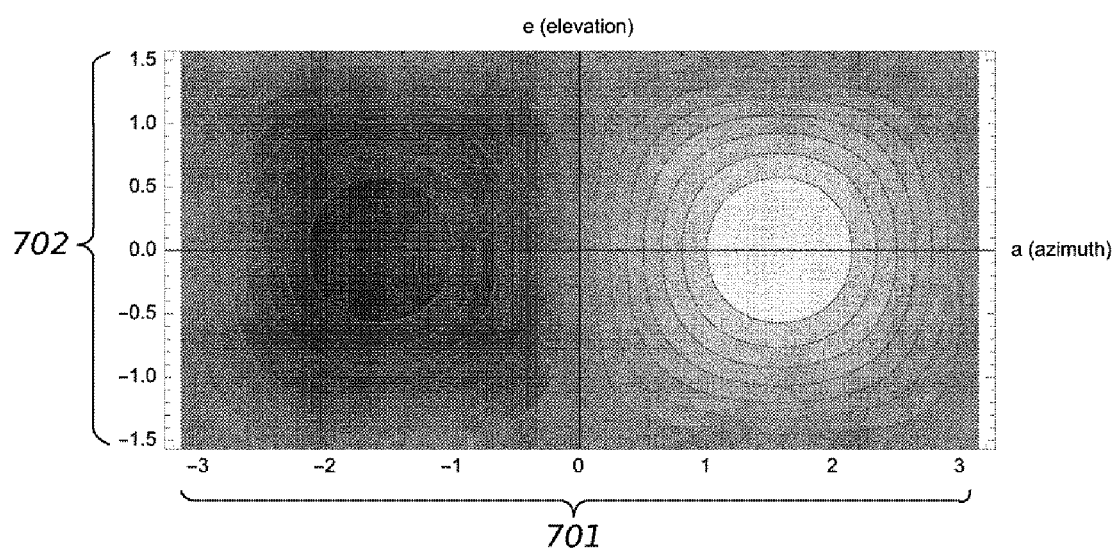
FIG. 7 describes, for a coplanar microphone device according to FIG. 6, the distribution of the panorama measurements as a function of the azimuth (701) (comprised between $-\pi$ and $\pi$) and the elevation (702) (comprised between $-\pi/2$ and $\pi/2$) of the source of the plane wave. The light areas represent the highest path difference values and the dark areas the lowest path difference values. Like in FIG. 5, a certain number of isolines (contours) are drawn.

It is trivial to show that the panorama thus assumes values in the interval [−1,1]. FIG. 7 illustrates the value of the panorama as a function of the azimuth a and the elevation e of the source, with $a_{look}=\pi/2$. The light colors are the highest values. The values are comprised between −1 and 1. These extrema are reached when one of the two functions $g_{M1}$ or $g_{M2}$ is canceled out, i.e., when the source is in a direction opposite the orientation of one of the two microphones.

According to certain implementations of the invention, it is also possible to perform, for each frequency of a plurality of frequencies, the measurement of the difference in acoustic path between the two microphones, as well as the difference in phase between the two microphones.

A device is considered with two microphones $M_1$ and $M_2$, positioned on an axis X with respective coordinates $x_{offset}$ and $-x_{offset}$, having the characteristic of not introducing phase or phase inversion into the acoustic signal that they capture.

The difference in path ΔL is the space between the two planes perpendicular to the propagation axis of the plane wave passing through the position of the microphone $M_1$ and the position of the microphone $M_2$. If the wave comes from a direction defined by the azimuth a and elevation e coordinates, the path difference is expressed:

$$\Delta L_{M1,M2}(a,e)=2x_{offset}\cos(a)\cos(e) \quad (6)$$

Figure 5:
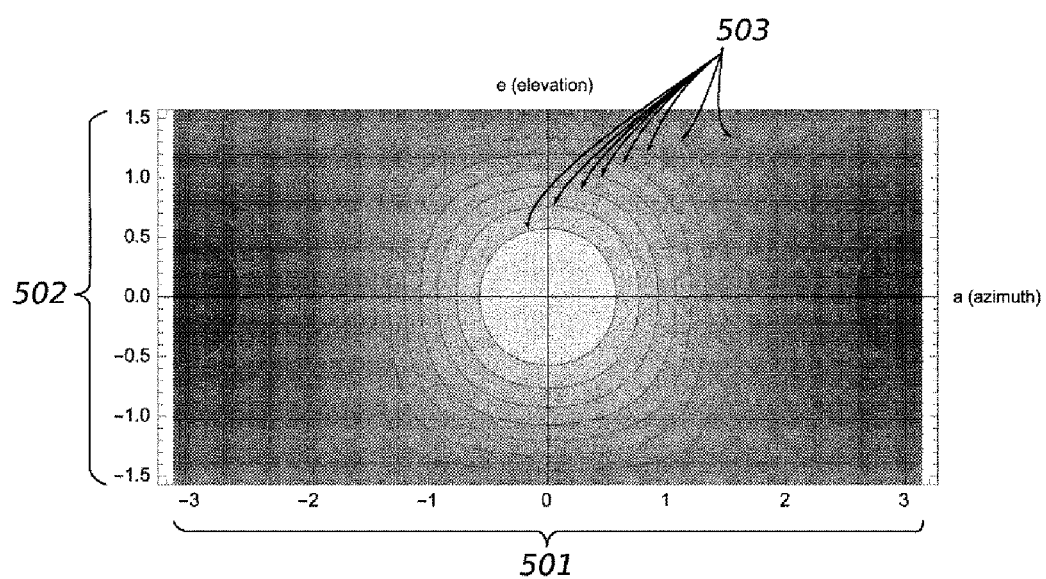
FIG. 5 describes the distribution of the path difference measurements as a function of the azimuth (501) (comprised between $-\pi$ and $\pi$) and the elevation (502) (comprised between $-\pi/2$ and $\pi/2$) of the source of the plane wave. The light areas represent the highest path difference values and the dark areas the lowest path difference values. The path difference values are comprised between $-2.x_{offset}$ and $+2.x_{offset}$. A certain number of isolines (for example (503)) (contours) are drawn.

FIG. 5 shows the path difference as a function of the azimuth a and elevation e of the source. The light shades are the highest values. The values are comprised between − $2x_{offset}$ and $2x_{offset}$.

The absolute phase difference ΔΦ between the signals captured by the two mics, given a frequency corresponding to a wavelength 2, depends on said path difference:

$$\Delta\Phi(a,e,\lambda)=\frac{2\pi}{\lambda}\Delta L(a,e) \quad (7)$$

The phase differences are being measured to within a multiple of 2π, so the normalized relative phase difference Δϕ is, i.e., brought back to the range]−π,π] is:

$$\Delta\varphi(a,e,\lambda)=\Delta\Phi(a,e,\lambda)+k2\pi \quad (8)$$

with k∈Z such that ΔΦ(a,e,π)∈]−π,π].

Regarding the correspondence between phase difference and acoustic path difference, two cases arise depending on the wavelength and the position deviation of the microphone buttons.

In the first case, the half-wavelength is greater than 2 $x_{offset}$, i.e., $\lambda>4\ x_{offset}$ There is then equality between the normalized relative phase difference and the phase difference, and there is therefore uniqueness of the correspondence between the normalized relative phase difference and the path difference:

$$\Delta\varphi(a,e,\lambda)=\Delta\Phi(a,e,\lambda) \quad (9)$$

therefore $$\Delta L(a,e)=\frac{\lambda}{2\pi}\Delta\Phi(a,e,\lambda) \quad (10)$$

In the second case, the half-wavelength is less than or equal to 2 $x_{offset}$, i.e., $\lambda\le 4\ x_{offset}$. The number of wave cycles added to the normalized phase difference can then be bounded. Indeed, the greatest path difference is observed for waves propagating along the axis X, in one direction or the other. Thus, when a phase difference ΔΦ(a, e, λ) is measured for a wavelength λ and an unknown azimuth a and elevation e source, all of the phase differences $$\Delta\Phi(a,e,\lambda)=\Delta\varphi(a,e,\lambda)+k2\pi, \quad (11)$$

$$avec\begin{cases} k\in\mathbb{Z} \\ |\Delta\Phi(a,e,\lambda)|\le\frac{2\pi}{\lambda}2x_{offset} \end{cases}$$

are potentially acceptable, and therefore the path differences obtained by the following formula also are:

$$\Delta L(a,e)=\frac{\lambda}{2\pi}\Delta\varphi(a,e,\lambda)+k\lambda avec\begin{cases} k\in\mathbb{Z} \\ |\Delta L(a,e)|\le 2x_{offset} \end{cases} \quad (12)$$

Figure 15:
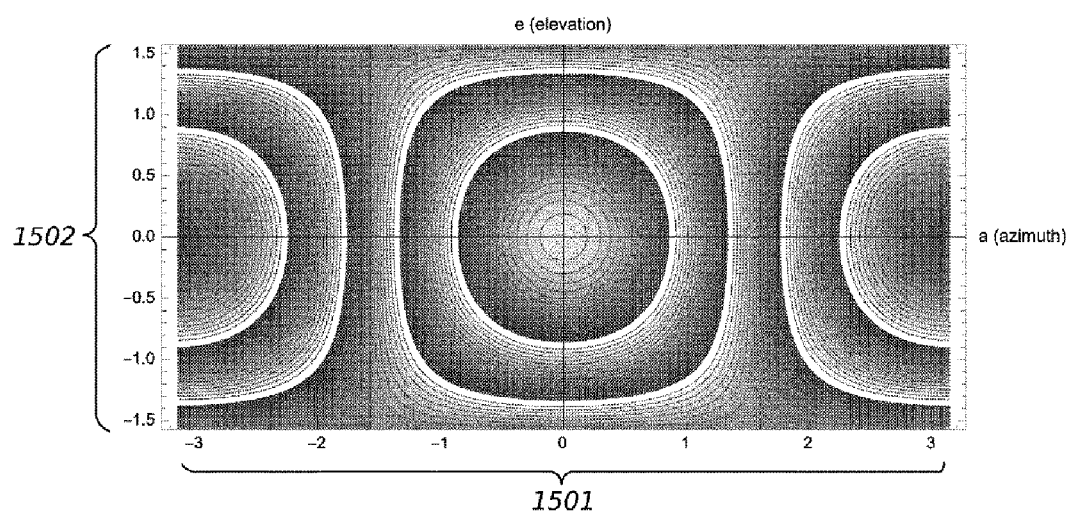
FIG. 15 illustrates the phase folding phenomenon based on the azimuth a (1501) and the elevation e (1502) of the source, for a monochromatic source with frequency f=20 kHz, with x$_{offset}$=2 cm and a speed of sound set at c=340 m/s. This phenomenon appears for any frequency such that the half-wavelength is less than or equal to 2 x$_{offset}$.

FIG. 15 illustrates this phase folding phenomenon based on the azimuth a (1501) and the elevation e (1502) of a monochromatic source with frequency f=20 kHz, with $x_{offset}$=2 cm and a speed of sound set at c=340 m/s. The light shades correspond to the values with the highest phase difference. Note that a same phase difference value can be obtained for several values of a and e.

A first preferred implementation of the present invention uses a coplanar arrangement of the two microphones. In this first implementation, shown in FIG. 6, the considered device comprises two microphone buttons (602, 603) with cardioid directivity placed in a space (601) (0, X Y, Z) as follows:

The first microphone $M_1$ (602) is placed in position ($x_{offset}$, 0,0) and is preferably oriented in the direction of the axis Y (604) in the positive direction, i.e., a plane wave propagating along the axis Y from the positive coordinates toward the negative coordinates will be perceived by the cardioid button under a maximum gain; its orientation will subsequently be described by the azimuth (605) and elevation ($a_{look}$, 0) coordinates.

The second microphone (603) is placed in position ($-x_{offset}$, 0,0) and is preferably oriented in the direction of the axis Y (604) in the negative direction, i.e., a plane wave propagating along the axis Y from the negative coordinates toward the positive coordinates will be perceived by the cardioid button under a maximum gain; its orientation will subsequently be described by the azimuth (606) and elevation ($a_{look}$+π,0) coordinates.

$a_{look}$ is preferably equal to π/2.

Figure 6:
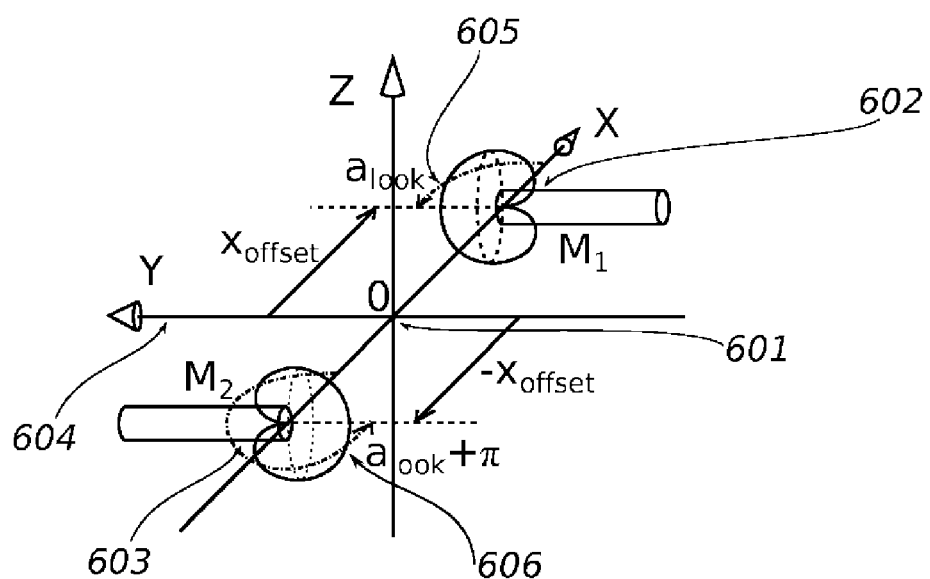
FIG. 6 shows, in the Cartesian coordinate system (601) with origin 0 and axes X, Y and Z, the coplanar arrangement, according to one implementation of the present invention, of two microphone buttons $M_1$ (602) and $M_2$ (603), whose main axes form an angle $a_{look}$ (605) for the first microphone, and $\pi+a_{look}$ (606) for the second microphone, with the axis oriented Y (604).

This arrangement of the microphones is shown in FIG. 6 in the Cartesian coordinate system.

To calculate the gains at the output of the microphones, a sinusoidal progressive plane wave is considered coming from the azimuth and elevation coordinates (a, e).

The gain in perception of microphone $M_1$, according to equation (2) and the conversion into Cartesian coordinates, is:

$$g_{M_1}(a,e)=\frac{1}{2}[1+\cos(e)\cos(a-a_{look})] \quad (13)$$

The gain in perception of microphone $M_2$ is:

$$g_{M_2}(a,e)=\frac{1}{2}[1-\cos(e)\cos(a-a_{look})] \quad (14)$$

The panorama is formulated, with the chosen microphone arrangement:

$$\text{Panorama}_{M_1M_2}(a,e)=\cos(a-a_{look})\cos(e) \quad (15)$$

And since $a_{look}$ is preferably equal to $\pi/2$:

$$\text{Panorama}_{M_1 M_2}(a,e) = \sin(a)\cos(e) \quad (16)$$

FIG. 7 illustrates, for a coplanar microphone device according to FIG. 6, the distribution of the panorama measurements as a function of the azimuth (701) (comprised between $-\pi$ and $\pi$) and the elevation (702) (comprised between $-\pi/2$ and $\pi/2$) of the source of the plane wave. The light areas represent the highest path difference values and the dark areas the lowest path difference values. Like in FIG. 5, a certain number of isolines (contours) are drawn.

The path difference and phase difference are calculated by applying equations 7 to 12, according to the method described above.

With the aim of determining azimuth and elevation of the incident wave, for the moment we will look at the wavelengths $\lambda < 4\, x_{offset}$, for which it has been demonstrated that there is uniqueness of the correspondence between the path difference and the phase difference.

Figure 8:
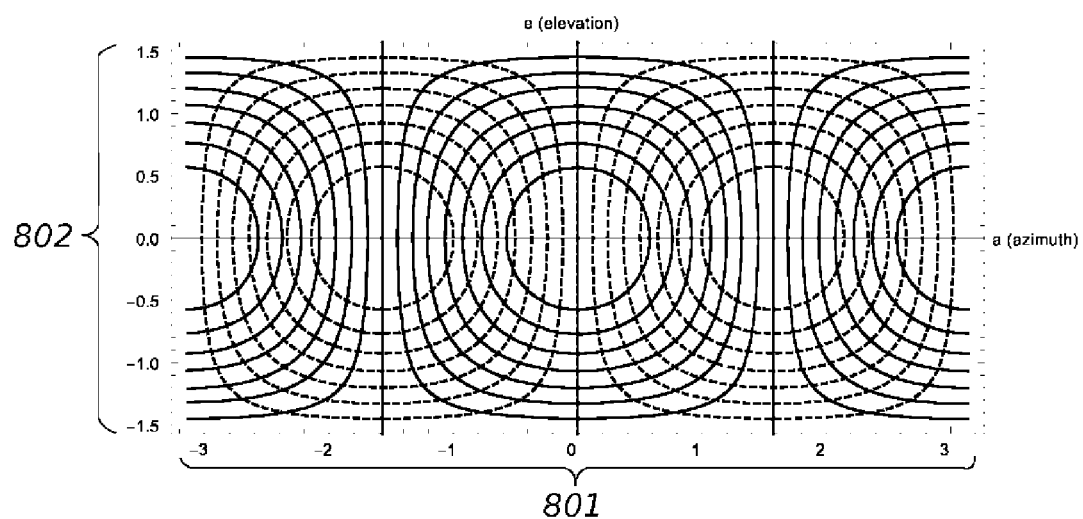
FIG. 8 shows the superposition of the isolines of FIG. 5 and FIG. 7, showing the determination uniqueness of the direction of origin for a given hemisphere (sign of the elevation angle), in the context of one of the implementations of the present invention.

If one superimposes FIGS. 5 (panorama) and 7 (phase difference, i.e., path difference), as shown in FIG. 8, it appears that given a panorama difference $p \in [-1,1]$ and a path difference t in the range of values of the function, there is, in each of the hemispheres $e \geq 0$ and $e \leq 0$, one and only one solution to the system of equations making it possible to obtain the azimuth a and the elevation e of the direction of origin of the wave:

$$\begin{cases} \text{Panorama}_{M_1,M_2}(a,e) = p \\ \Delta L_{M_1,M_2}(a,e) = t \end{cases} \quad (17)$$

Thus, if the capture principle is restricted to a hemispherical or surround capture, it is possible to restrict oneself to the interpretation of the direction of origin as that of one of the two hemispheres, in the case at hand and preferably the hemisphere $e \geq 0$.

Given, for a sinusoidal progressive plane wave with wavelength $\lambda > 4\, x_{offset}$, a panorama measurement p and a path difference measurement t, for an oriented microphone device with $a_{look} = \pi/2$ and positioned at $\pm x_{offset}$, the system of equations becomes, by setting out $$k = \frac{t}{2x_{offset}}:$$

$$\begin{cases} \sin(a)\cos(e) = p \\ \cos(a)\cos(e) = k \end{cases} \quad (18)$$

where one recognizes the expression of the Cartesian coordinates x and y of a unitary vector of azimuth a and elevation e spherical coordinates.

If p and t are both nil, in other words if $\cos(e)=0$, then $e = \pm \pi/2$. Since the preferred hemisphere is $e \geq 0$, then $e = \pi/2$ and a is equal to any value whatsoever, not influencing the vector describing the origin of the wave.

If p or t is not nil, in other words $\cos(e) \neq 0$, considering that $\sin(a)^2 + \cos(a)^2 = 1$:

$$\frac{p^2}{\cos(e)^2} + \frac{k^2}{\cos(e)^2} = 1 \quad (19)$$

$$\cos(e)^2 = p^2 + k^2 \quad (20)$$

Since we have chosen the hemisphere $e \geq 0$, we obtain:

$$\cos(e) = \sqrt{p^2 + k^2} \quad (21)$$

and therefore $$e = \arccos\sqrt{p^2 + k^2} \quad (22)$$

For known $\cos(e) \neq 0$, by reinjecting it into equation 18, we can therefore immediately obtain, according to the system of equations:

$$\begin{cases} \sin(a) = \dfrac{p}{\cos(e)} \\ \cos(a) = \dfrac{k}{\cos(e)} \end{cases} \quad (23)$$

from which $a = a\tan 2(p,k)$ where $a\tan 2(y,x)$ is the operator that yields the oriented angle between a vector $(1,0)^T$ and a vector $(x,y)^T$; this operator is available in the form of a function std::a tan 2 from the STL library of the C++ language.

A second preferred implementation of the present invention uses a coplanar arrangement of the two microphones. In this second implementation, the device comprises two microphone buttons with cardioid directivity placed in a space (X, Y, Z) as follows:

The first microphone $M_1$ is placed in position ($x_{offset}$, 0,0) and is oriented according to the azimuth and elevation coordinates ($a_{look}$, $e_{look}$).

The second microphone is placed in position ($-x_{offset}$, 0,0) and is oriented according to the azimuth and elevation coordinates ($a_{look} + \pi$, $e_{look}$).

Figure 9:
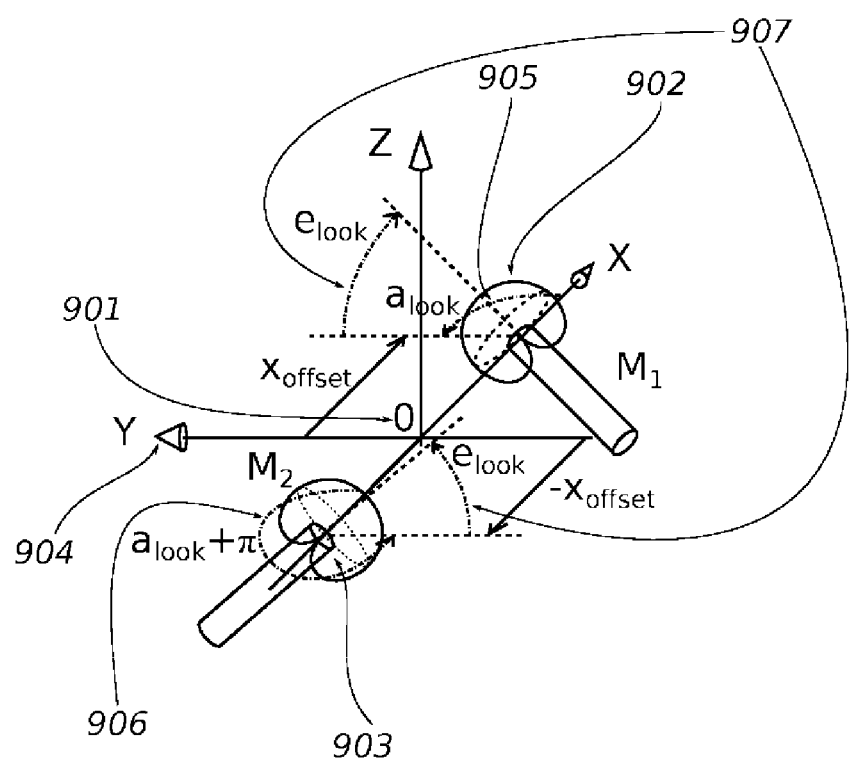
FIG. 9 shows, in the Cartesian coordinate system (901) with origin 0 and axes X, Y and Z, the coplanar arrangement, according to one implementation of the present invention, of two microphone buttons with cardioid directivity $M_1$ (902) and $M_2$ (903). The main oriented axis of the first button 902 forms an angle $a_{look}$ (905) with the oriented axis Y (904), and an angle $e_{look}$ (907) with the plane XY. The main oriented axis of the second button 902 forms an angle $\pi+a_{look}$ (906) with the oriented axis Y (904), and an angle $e_{look}$ (907) with the plane XY.

$a_{look}$ is preferably equal to $\pi/2$, $e_{look}$ is preferably equal to a positive value and within the interval $[0, \pi/4]$. This arrangement, illustrated by FIG. 9, includes the arrangement previously described when $e_{look} = 0$.

To calculate the output gains of the microphones, a sinusoidal progressive plane wave is considered coming from the azimuth and elevation coordinates (a, e).

The perception gain of the microphone $M_1$, according to equations (2) and (3) and the conversion into Cartesian coordinates, is:

$$g_{M_1}(a,e) = \tfrac{1}{2}[1 + \cos(e)\cos(a - a_{look})\cos(e_{look}) + \sin(e)\sin(e_{look})] \quad (24)$$

The gain in perception of the microphone $M_2$ is:

$$g_{M_2}(a,e) = \tfrac{1}{2}[1 - \cos(e)\cos(a - a_{look})\cos(e_{look}) + \sin(e)\sin(e_{look})] \quad (25)$$

The panorama is formulated, with the chosen microphone arrangement:

$$\text{Panorama}_{M_1,M_2}(a,e) = \frac{\cos(e)\cos(a - a_{look})\cos(e_{look})}{1 + \sin(e)\sin(e_{look})} \quad (26)$$

Figure 10:
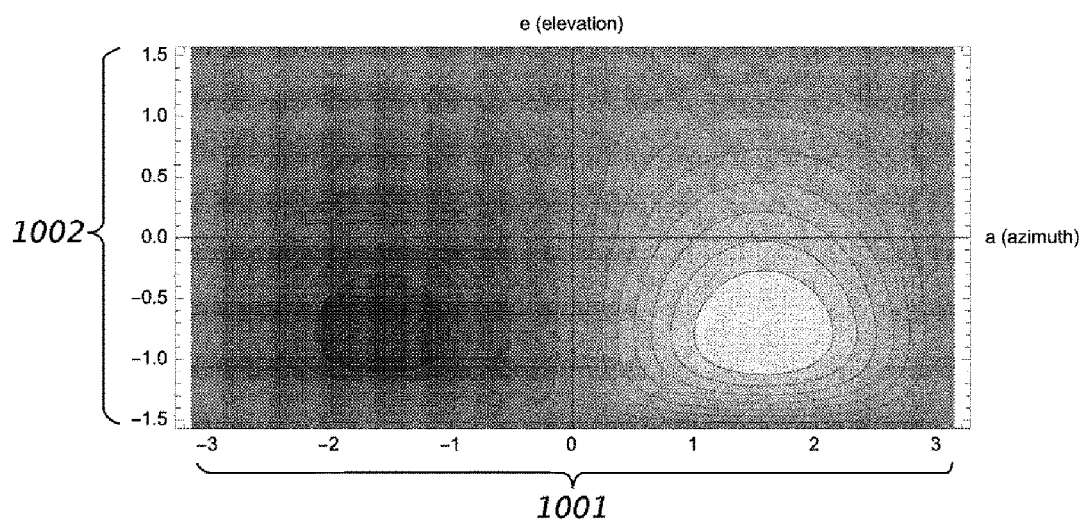
FIG. 10 illustrates the behavior of the panorama as a function of the azimuth a (1001) and the elevation e (1002) of the source, with $a_{look}=\pi/2$ and $e_{look}=\pi/4$. The light colors are the highest values. The values are comprised between $-1$ and 1. These extrema are reached when one of the two functions $g_{M1}$ or $g_{M2}$ is canceled out, i.e., when the source is in a direction opposite the orientation of one of the two microphones.

FIG. 10 illustrates the behavior of the panorama as a function of the azimuth a and the elevation e of the source, with $a_{look} = \pi/2$ and $e_{look} = \pi/4$. The light colors are the highest values. The values are comprised between $-1$ and $1$. These extrema are reached when one of the two functions $g_{M_1}$ or $g_{M2}$ is canceled out, i.e., when the source is in a direction opposite the orientation of one of the two microphones.

The path difference and phase difference are calculated by applying equations 7 to 12, according to the method described above.

With the aim of determining azimuth and elevation of the incident wave, for the moment we will look at the lengths $\lambda > 4\, x_{offset}$, for which there is uniqueness of the correspondence between the path difference and the phase difference.

Figure 11:
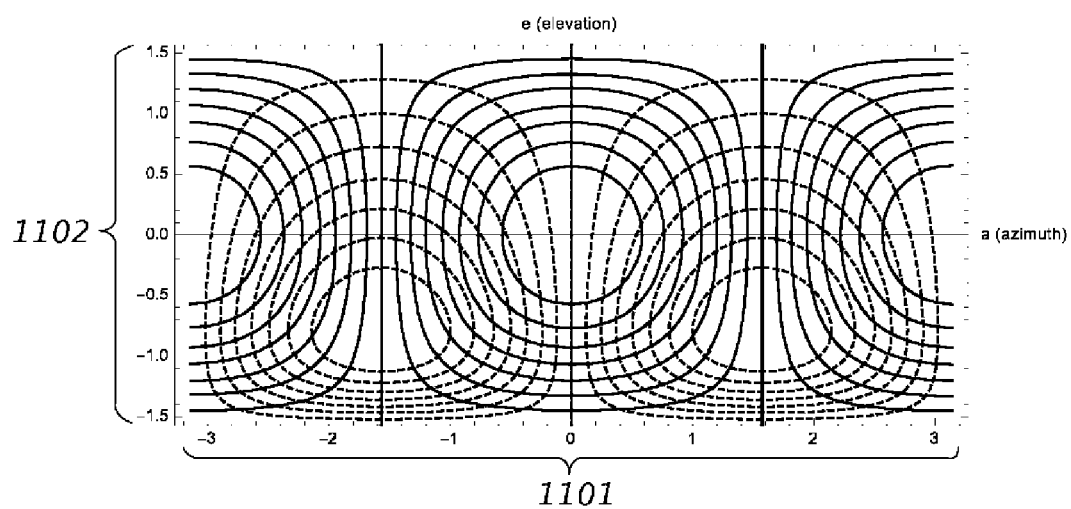
FIG. 11 shows the superposition of the isolines of FIG. 5 and FIG. 10, showing the determination uniqueness of the direction of origin for a given half-space, in the context of one of the implementations of the present invention.

As illustrated in FIG. 11 for $a_{look} = \pi/2$ and $e_{look} = \pi/4$, if the panorama and phase difference (i.e., path difference) graphs are superimposed, it appears that given a panorama difference $p \in [-1,1]$ and a phase difference t in the range of the values of the functions, it is possible to split the sphere into two parts:
- an upper part, which fully contains the hemisphere $e \geq 0$, and
- a lower part contained in the hemisphere $e \leq 0$ in each of which one and only one solution is present to the system of equations making it possible to obtain the azimuth a and the elevation e of the direction of origin of the wave:

$$\begin{cases} Panorama_{M_1,M_2}(a,e) = p \\ \Delta L_{M_1,M_2}(a,e) = t \end{cases}$$

Thus, if the principle of three-dimensional capture is restricted to a capture over only part of the space, it is possible to restrict oneself to the interpretation of the direction of origin as that of one of the two parts of the sphere, in the case at hand the upper part, covering more than one hemisphere.

Given, for a sinusoidal progressive plane wave with wavelength $\lambda > 4\, x_{offset}$, a panorama measurement p and a path difference measurement t, for an oriented microphone device with an azimuth $a_{look} = \pi/2$ and a configurable elevation $e_{look}$, and positioned at $\pm x_{offset}$, the system of equations becomes, by setting out $$k = \frac{t}{2x_{offset}}:$$

$$\begin{cases} \dfrac{\sin(a)\cos(e)\cos(e_{look})}{1 + \sin(e)\sin(e_{look})} = p \\ \cos(a)\cos(e) = k \end{cases} \quad (27)$$

or:

$$\begin{cases} \sin(a) = \dfrac{p(1 + \sin(e)\sin(e_{look}))}{\cos(e)\cos(e_{look})} \\ \cos(a) = \dfrac{k}{\cos(e)} \end{cases} \quad (28)$$

By considering that $\sin(a)^2 + \cos(a)^2 = 1$:

$$\left[\frac{p(1 + \sin(e)\sin(e_{look}))}{\cos(e)\cos(e_{look})}\right]^2 + \left[\frac{k}{\cos(e)}\right]^2 = 1 \quad (29)$$

which is written as a second degree polynomial as sin(e):

$$[p^2 + (k^2-1)\cos(e_{look})^2] + [2p^2 \sin(e_{look})]\sin(e) + [(p^2-1)\sin(e_{look})^2 + 1]\sin(e)^2 = 0 \quad (30)$$

which has the roots, if they are expressed, i.e., if $\Delta \geq 0$:

$$\sin(e) = \frac{-p^2 \sin(e_{look}) \pm \dfrac{\sqrt{\Delta}}{2}}{(p^2-1)\sin(e_{look})^2 + 1} \quad (31)$$

where $$\Delta = 2\,\cos(e_{look})^2 [1 - p^2 - k^2(1+p^2) + (k^2-1)(p^2-1)\cos(2e_{look})] \quad (32)$$

Thus the elevation e is known: it is the choice of e whose the elevation is the highest. It is then possible, by reinjecting e into equation 28, to know the azimuth a according to its sine and cosine.

In the implementations of the invention, a sub-determination of the direction of origin is encountered when the wavelength $\lambda$ of the plane wave that one wishes to analyze is less than or equal to twice the distance between the microphone buttons, i.e., $\lambda \leq 4\, x_{offset}$.

There may then be an indetermination on the number of periods undergoing propagation between the microphones at a given moment. This is reflected, in the expression of the path between the waves, by the addition or removal of an integer number of periods, before recovering the azimuth and the elevation. The number of the intercalary periods is bounded by the maximum possible number of periods given the spacing between the microphones.

A certain number of absolute phase differences are thus obtained. For each of these absolute phase differences, an azimuth and an elevation are determined. Among these multiple azimuth and elevation pairs, the one is chosen that is closest to the azimuth and the elevation of a fundamental potential whose wavelength is greater than $4.x_{offset}$.

Once the direction of origin of the wave is determined, it is necessary to determine its magnitude. In the case of a pair of microphones whose axis is comprised in the plane XY (i.e., for which the angle $e_{look}$ is nil), the sum of the gains of the two microphones is:

$$g_{M_1}(a,e) + g_{M_2}(a,e) = 1 \quad (33)$$

thus the magnitude of the wave is equal to the sum of the magnitudes of the microphones.

In the case of a pair of microphones for which the angle $e_{look}$ is any angle, the sum of the gains of the two microphones is:

$$g_{M_1}(a,e) + g_{M_2}(a,e) = 1 + \sin(e)\sin(e_{look}) \quad (34)$$

Figure 12:
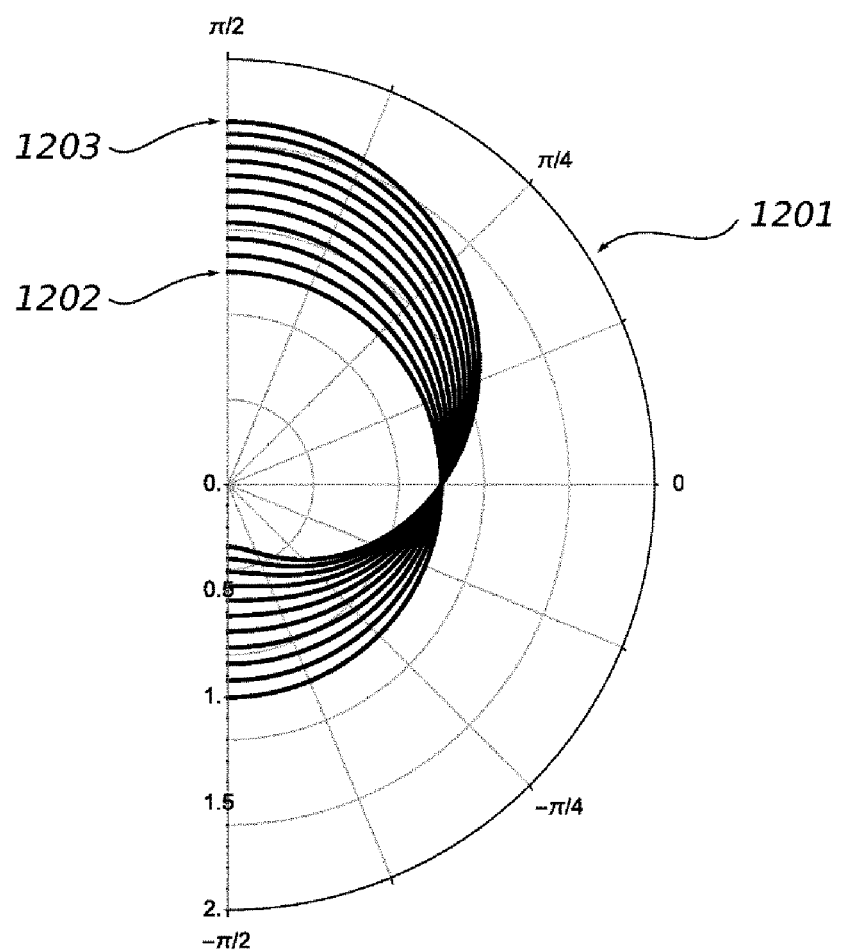
FIG. 12 illustrates the evolution of the value of the sum of the gains as a function of the elevation (1201) of the source, for $e_{look}$ assuming values comprised between 0 (curve 1202) and $\pi/4$ (curve 1203).

FIG. 12 illustrates the value of the sum of the gains as a function of the elevation (1201) of the source, for $e_{look}$ assuming values comprised between 0 (curve 1202) and $\pi/4$ (curve 1203).

Several approaches can thus be adopted to obtain the volume of the analyzed signal. The most direct method consists of using the sum of the gains directly. However, the increase in the volume for the waves coming from high elevations is not desirable. The compensation of the gain function consists of summing the volumes measured by each of the mics for the wave being analyzed, then multiplying the result by the inverse of the total gain function for the estimated elevation.

The favored implementation selected in the context of the present invention consists of:
preserving the calculated gain for the low or negative estimated elevations, and compensating the gain measurement by multiplying it by the inverse of the function, only for the positive estimated elevations.

Once the direction of origin of the wave and the magnitude of the wave are determined, it is necessary to determine its phase. For the device comprising an omnidirectional button, it suffices to use the phase received by said omnidirectional button. On the contrary, for devices comprising two cardioid buttons, it is necessary to adopt the method below.

For all of the wavelengths $\lambda > 4x_{offset}$, it is possible to estimate the phase of the wave at the center of the device, without indetermination: since the phase difference is, in absolute value, less than n, it suffices to add or subtract, respectively, half of the phase difference to or from the signal of the first microphone or the second microphone.

Alternatively, it is possible to use the phase of only one of the two microphones, with the drawback of having a shadow zone behind the selected microphone, which requires attenuating the amplitude of the output signal in the direction opposite that of the selected microphone; this can be problematic in the arrangement with $e_{look}=0$ if the microphones are not subcardioid, but possible and not very problematic for an arrangement with a higher $e_{look}$, for example close to $\pi/4$.

For the wavelengths $\pi \leq 4\ x_{offset}$, the phase difference may have been determined to within the cycle by the analysis of the fundamental waves as described above. However, errors may have been committed, and the user may find it preferable to choose the phase captured by one of the two microphones, with the drawback of the "hole."

A third preferred implementation of the present invention uses a device with two microphone buttons, the first button having omnidirectional behavior and the second button having cardioid behavior:

the first microphone $M_1$ is placed in position $(x_{offset}, 0,0)$. Not being directional, there is no preferred orientation for its main axis;

the second microphone $M_2$ is placed in position $(x_{offset}, 0,0)$ and is oriented along an azimuth $a_{look}=\pi/2$, i.e., in the direction of the positive axis Y, in other words a plane wave propagating along the axis Y from the positive coordinates toward the negative ones will be perceived by the cardioid button under a maximum gain.

Figure 13:
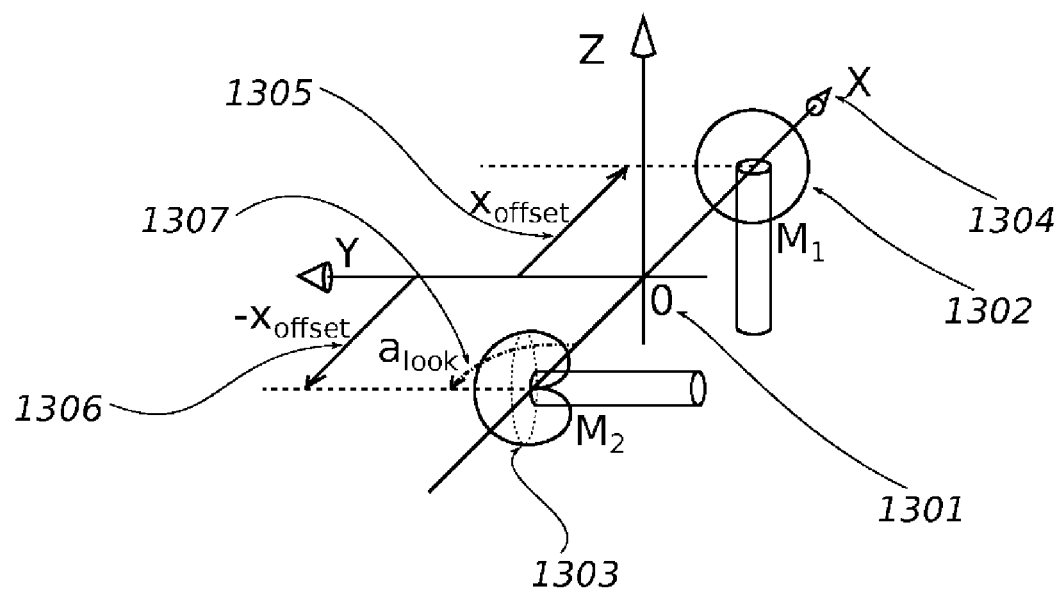
FIG. 13 shows, in the Cartesian coordinate system (1301) with origin 0 and axes X, Y and Z, the arrangement, according to one implementation of the present invention, of a first microphone button with omnidirectional directivity $M_1$ (1302) and a second microphone button with cardioid directivity M$_2$ (1303), both situated on the axis X (1304), at abscissa x$_{offset}$ (1305) and −x$_{offset}$ (1306). The first button 1302 has any orientation. The main oriented axis of the second button 1303 forms an angle a$_{look}$ (1307) with the oriented axis X (1304).

FIG. 13 illustrates this microphone arrangement.

For said arrangement, a sinusoidal progressive plane wave is considered coming from the azimuth and elevation coordinates (a, e).

The perception gain of the microphone $M_1$, omnidirectional, is:

$$g_{M_1}(a,e)=1 \quad (35)$$

The perception gain of the microphone $M_2$, cardioid, is:

$$g_{M_2}(a,e)=\tfrac{1}{2}(1+\sin(a)\cos(e)) \quad (36)$$

The concept of magnitude ratio, denoted hereinafter MagnitudeRatio(a, e), replaces the concept of panorama used with the other presented devices.

The magnitude ratio is formulated as follows:

$$MagnitudeRatio_{M_1,M_2}(a, e) = \frac{g_{M_2}(a, e)}{g_{M_1}(a, e)} \quad (37)$$

or:

$$MagnitudeRatio_{M_1,M_2}(a, e) = \frac{1}{2}(1 + \sin(a)\cos(e)) \quad (38)$$

Figure 14:
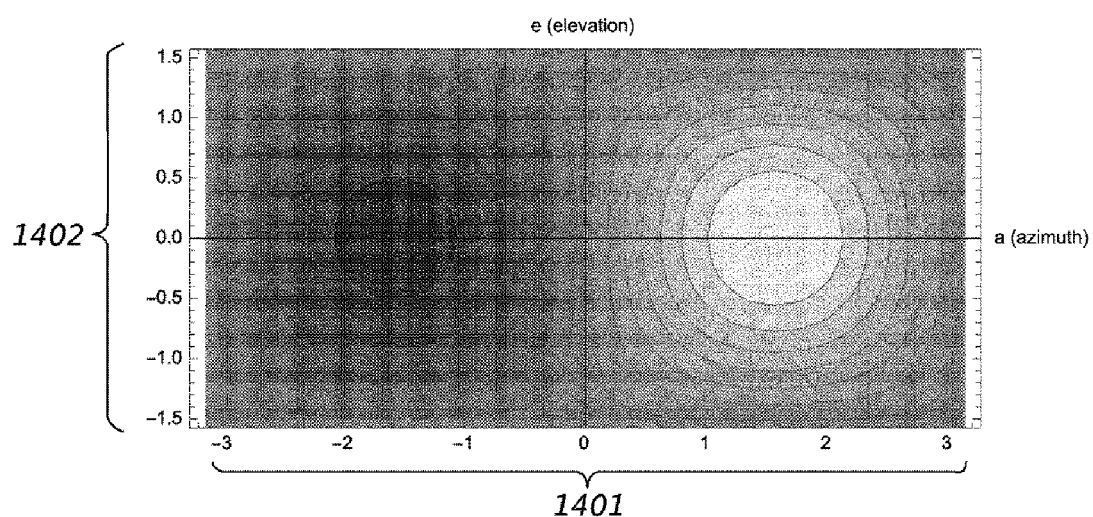
FIG. 14 illustrates the evolution of the ratio of the magnitudes as a function of the azimuth a (1401) and the elevation e (1402) of the source, with a$_{look}$=π/2. The light colors are the highest values. The values are comprised between 0 and 1. These extrema are reached respectively in the rear and front directions of the cardioid microphone M$_2$.

FIG. 14 illustrates the variation of the magnitude ratio as a function of the azimuth a (1401) and the elevation e (1402) of the source, with $a_{look}=\pi/2$. The light colors are the highest values. The values are comprised between 0 and 1. These extrema are reached respectively in the rear and front directions of the cardioid microphone $M_2$.

The path difference and phase difference are calculated by applying equations 7 to 12, according to the method described above.

In order to determine the azimuth and the elevation of the source, one can see that the magnitude ratio follows the same formula as the panorama of the planar device with two cardioid microphones, to within an affine transformation. The path difference and the phase difference also following the same rules; the types and orientations of the microphones do not come into play in these calculations.

It is then possible to base oneself on the same reasoning to arrive at the following result:

$$\begin{cases} e = \arccos\sqrt{p^2 + k^2} \\ \quad a = \operatorname{atan2}(p, k) \end{cases} \quad (39)$$

where $$k = \frac{t}{2x_{offset}},$$

t is the path difference traveled $\Delta L$ which is calculated from the relative phase difference $\Delta\varphi$ and the wavelength $\lambda$, and p is the equivalent panorama calculated from the magnitude ratio r: p=2r−1.

The wavelengths such that $\lambda \leq 4.x_{offset}$ have an undetermined traveled path difference. Their processing is addressed hereinafter.

The magnitude of the signal and its phase are next advantageously chosen like those of the omnidirectional microphone, avoiding shadow zones and phase joining.

The method for processing the captured signal contains a calibration means. Indeed, the actual microphones differ from their theoretical model, as already discussed above. Furthermore, obstruction phenomena of the sound signal may occur, a microphone or its support being able to be found on the acoustic path from one wave to another. Additionally, the actual space between the buttons or the propagation speed of the sound wave may differ from their theoretical values or values indicated by the user. Therefore, the phase difference at the low frequencies may be so small that a minimal phase defect of the buttons may introduce localization artifacts for them. The lowest frequencies of the audible spectrum do not necessarily require localization, since this localisation is not perceived by the listener. During the analysis and transcoding, an arbitrary position may be allocated to them, for example at the azimuth and elevation coordinates (0,0). Furthermore, and depending on the distance between the microphones ($x_{offset}$), the phase difference may be too small with respect to phase errors introduced by the capture of the microphones. It is then possible to analyze frequencies below a certain threshold and determine their location based on the location of the harmonics.

For the devices comprising two cardioid buttons (respectively an omnidirectional button and a cardioid button), four calibration methods for the panorama (respectively magnitude ratio) and phase difference responses are presented to offset the deviations between the theoretical model and the concrete device.

In a first method, the panorama (respectively magnitude ratio) and phase difference responses are calibrated using a visualisation of the points captured in the azimuth and elevation axes plane and presented to the user. To that end, a real-time graphic visualization of the cloud of dots (azimuth, elevation) generated by the detection of the positions of the different coefficients makes it possible to perform a first calibration of the system. In a calm environment, a spectrally rich acoustic source, such as a speaker broadcasting white noise, a sinesweep signal, or the human mouth emitting the "sh" sound in a prolonged manner is used in different directions with respect to the device. When the source is positioned along the axis X, on one side or the other, the cloud of dots varies when the distance parameter $x_{offset}$ is modified: it moves away from the ideal direction while forming an arc around the direction when it assumes too low a value, and becomes over-concentrated when it assumes too high a value. When the source is positioned along the axis Y, on one side or the other, the cloud of dots varies when a multiplier parameter of the measured panorama (respectively magnitude ratio) is modified (but bounded and saturated at the interval [−1,1]) (respectively [0,1]): it expands or contracts for an overly low or overly high value. Adequate $x_{offset}$ and panorama (respectively magnitude ratio) multiplier values make it possible to observe, when the source moves in the horizontal plane around the device, a cloud moving in azimuth in a fluid manner reproducing the movement of the source. This first panorama-phase (respectively magnitude ratio-phase) calibration method can be applied a posteriori on a recorded and non-analyzed signal of the mics during decoding, as long as the test signals have been introduced in recording.

In a second method, the panorama (respectively magnitude ratio) and phase difference responses are calibrated using automated learning of the variation ranges of the phase difference and panorama (respectively magnitude ratio) measurements. To that end, in a calm environment, a spectrally rich acoustic source, such as a speaker broadcasting white noise, a sinesweep signal, or the human mouth emitting the "sh" sound in a prolonged manner is used in different directions with respect to the device. When the source is positioned along the axis X, on one side or the other, a calibration phase is triggered on several successive processing blocks of the short-term Fourier transform (or the equivalent transform used). For each of the directions of origin of the signal (source at the azimuth 0 or π), the phase difference is recorded for each pair of complex coefficients representing a frequency band, whose wavelength does not allow sub-determination ($\lambda > 4\, x_{offset}$), an average of the phase differences is measured, which makes it possible to obtain a minimum phase difference $\Delta\varphi_{min}$, a maximum phase difference $\Delta\varphi_{min}$ corresponding to each frequency band. Once the phase difference is calibrated, the localization algorithm of the sources is modified, in that a phase difference measurement will immediately be altered to be recalibrated in an affine manner from the range of original values to the range of values measured on calibration:

$$\Delta\varphi_{recalibrated} = \Delta\varphi_{theoretical,min} + \qquad (40)$$
$$(\Delta\varphi_{theoretical,max} - \Delta\varphi_{theoretical,min})\frac{\Delta\varphi_{measured} - \Delta\varphi_{min}}{\Delta\varphi_{max} - \Delta\varphi_{min}}$$

if $\Delta\varphi_{max} - \Delta\varphi_{min} \neq 0$, otherwise the value is not modified or assumes a nil value. When the source is positioned along the axis Y, on one side or the other, a similar procedure is applied: for each frequency band, on successive processing blocks, the minimum panorama Panorama$_{min}$ (respectively minimum magnitude ratio) and the maximum panorama Panorama$_{max}$ (respectively maximum magnitude ratio) are measured and averaged. Once the panorama (respectively magnitude ratio) is calibrated, the localization algorithm of the sources is modified, in that a panorama (respectively magnitude ratio) measurement is immediately altered to be recalibrated in an affine manner from the range of original values to the range of values measured on calibration:

$$Panorama_{recalibrated} = \qquad (41a)$$
$$Panorama_{th,min} + (Panorama_{th,max} - Panorama_{th,min})$$
$$\frac{Panorama_{measured} - Panorama_{min}}{Panorama_{max} - Panorama_{min}}$$

$$\left(\text{respectively } MagnitudeRatio_{recalibrated} = \right. \qquad (41b)$$
$$\left.\frac{MagnitudeRatio_{measured} - MagnitudeRatio_{min}}{MagnitudeRatio_{max} - MagnitudeRatio_{min}}\right)$$

where Panorama$_{th,min}$ and Panorama$_{th,max}$ are the theoretical panorama values taken at the azimuths $-\pi/2$ and $\pi/2$. Then the panorama (respectively MagnitudeRatio) value is saturated to have values only in the interval [−1,1] (respectively [0,1]).

In a third method, a calibration of the panorama and phase difference responses consists, for each frequency band, of correcting the obtained spherical coordinates (azimuth, elevation) by using a learned spatial correspondence between a measurement sphere and an actual coordinates sphere. To that end, the user defines calibration points on the coordinates sphere. These points form a triangle mesh of the sphere (techniques used for the "VBAP" 3D audio rendering); the triangle mesh is used to perform interpolations between the points. These points can be predefined, for example the points at the azimuth and elevation coordinates (0, 0), (π/2, 0), (π, 0), (−π/2,0), (0, π/2); an additional point without calibration (because outside the measuring range) makes it possible to complete the comprehensive mesh of the sphere: (0, −π/2). For each calibration point, the user produces, in the direction of the calibration point, in a calm environment, a signal with a rich spectrum, either using white noise broadcast by a speaker, or a sinesweep signal, or by pronouncing the sound "sh." Over several successive processing windows, the coordinates for each frequency band are averaged and recorded. One thus obtains, for each frequency band, another mesh of the sphere, hereinafter called "learned mesh," whose measuring points each correspond to a point of the "reference mesh," that made up of the points at the calibration coordinates. The algorithm is thus modified to use the learning done. For each frequency band, once the azimuth and elevation coordinates are determined by the algorithm, they are modified:
  the coordinates are analyzed to determine the triangle of the learned mesh to which they belong, using a VBAP technique, as well as the barycentric coefficients applied to the apices of the triangle,
  the barycentric coefficients are applied to the corresponding triangles in the reference mesh in order to obtain a recalibrated azimuth and elevation.

Figure 16:
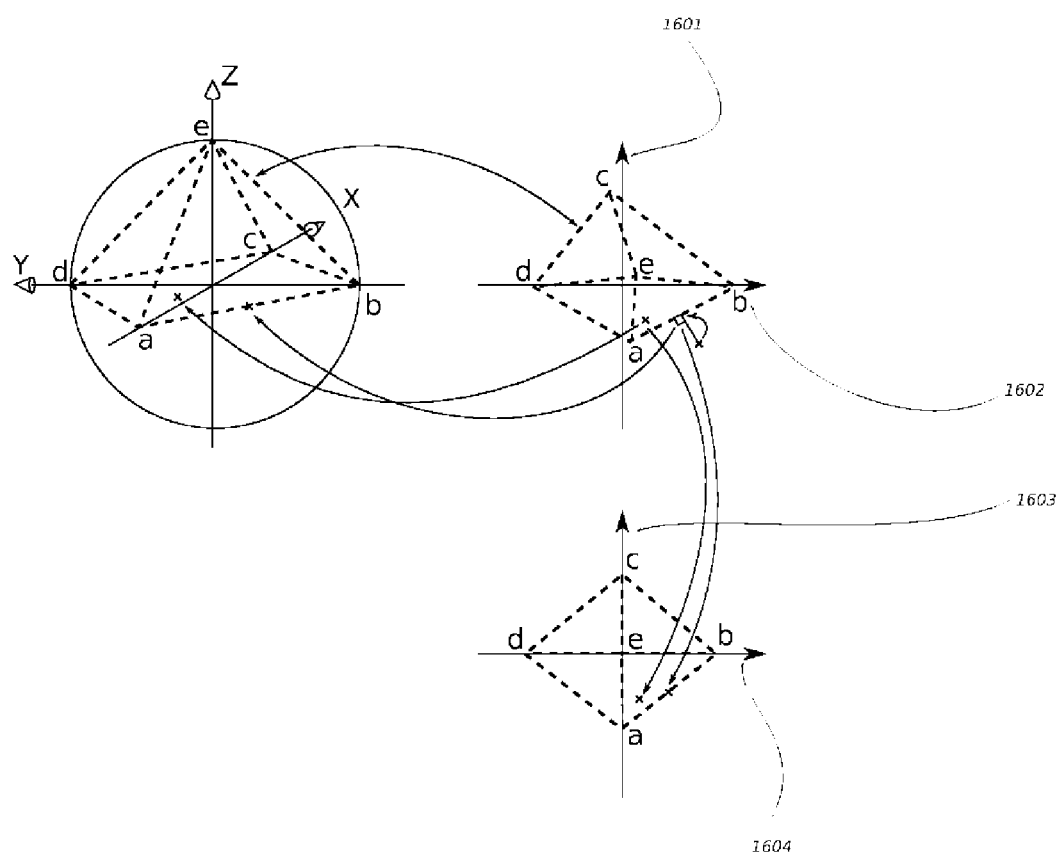
FIG. 16 illustrates a calibration technique based on match learning between the spatial domain and the measurement domain.

In a fourth method, a calibration, for each frequency band, makes it possible to correct panorama (or magnitude ratio) measurements as well as the phase difference before determining the direction of origin. This correction is based on a learning phase, by excitation of the system using spectrally rich sounds or a sinesweep, in various directions, for example from the azimuth and elevation coordinates (0, 0), ($\pi$/2, 0), ($\pi$, 0), (–$\pi$/2, 0), (0, $\pi$/2). These directions form a partial mesh of the sphere in triangles, like in the VBAP techniques, for example using a Delaunay triangulation. This mesh is replicated, for each frequency band in the two-dimensional space between the measured panorama (or magnitude ratio) (1602, 1604) and phase difference (1601, 1603) values, like in the example illustrated in FIG. 16.

The analysis of the direction of origin of a signal is modified in one of the two following ways:
  a panorama (or magnitude ratio) as well as phase difference measurement determines a point in the two-dimensional range, which makes it possible to determine, in the two-dimensional mesh of said frequency band, a triangle to which it belongs, or if the point does not belong to any triangle, the closest segment or apex of the mesh is determined. By correspondence of the two-dimensional mesh with the partial mesh of the sphere, an azimuth and elevation are determined, without using the azimuth and elevation determination formulas as a function of the panorama (or magnitude ratio) and phase difference.
  a panorama (or magnitude ratio) as well as phase difference measurement determines a point in the two-dimensional range, which makes it possible to determine, in the two-dimensional mesh of said frequency band, a triangle to which it belongs, or if the point does not belong to any triangle, the closest segment or apex of the mesh is determined. By correspondence of the measured two-dimensional mesh with the theoretical two-dimensional mesh, a corrected panorama (or magnitude ratio) and phase difference measurement are determined.

Regardless of the implementation chosen for the present invention, and therefore regardless of the physical arrangement of the two microphones, the format of the dual-channel signal obtained by the microphones is in itself a spatial encoding of the audio signal. It may be used and transmitted as is, but will require, at one step of the chain, the appropriate spatial analysis for its use. The spatial analysis and the extraction of the specific characteristics of the signal as presented in the present invention, are, in their digital format (spectral content and its spatial correspondence), another spatial encoding format of the audio signal. In certain implementations of the invention, they make it possible, in any step of the transmission chain of the sound signal, to transcode toward a plurality of other formats, for example and non-limitingly:
  VBAP 2D or 3D, VBIP 2D or 3D
  DBAP 2D or 3D, DBIP 3D or 3D
  Pair-wise panning 2D or layered-2D or 3D
  First-order spherical harmonies (Ambisonics, FOA) A-Format or B-Format, 2D or 3D, or Higher-order spherical harmonies (Ambisonics, HOA)
  Binaural
  Surround mastered on two channels
  Any digital format separating the spectral content and the spatial data The mastered or spatial harmonic formats are particularly suitable for processing spatial audio, since they allow the manipulation of the sound field while allowing the use of certain traditional tools in the audio industry. Dual-channel formats are, however, those which make it possible to use the existing production chains and their formats more immediately; indeed, in most cases only two audio channels are provided.

The frequency implementation of the method for determining direction of origin, magnitude and phase of the wave is done as follows: the microphones are positioned according to one of the arrangements previously indicated. Alternatively, a recording having used a corresponding arrangement of buttons is used at the input of the algorithm.

The dual-channel signal goes through an analysis of the short-term Fourier transform type, or a similar time-to-frequency transform, such as MDCT/MCLT, complex wavelet transform, complex wavelet packet transform, etc. For each channel each corresponding to one of the two microphones, a complex coefficient vector is obtained corresponding to the frequency content of the signal, magnitude and phase.

The coefficients of the two vectors corresponding to the same frequency band are paired, and each pair of coefficients the spatial origin of the sound source for the frequency band in question, namely azimuth and elevation is analyzed, then the complex coefficient corresponding to the sound content of the analyzed plane wave is reconstituted, namely magnitude and phase.

Thus obtained for the frequency band are an azimuth value, an elevation value, and a complex coefficient corresponding to the magnitude and the phase of the wave in said frequency band. The signal is then transcoded, from said azimuth, elevation, magnitude and phase values, in a format chosen by the user. Several techniques are presented as examples, but they will appear obvious for a person knowing the state of the art of sound rendering or encoding the sound signal.

First-order spherical harmonic transcoding (or first-order ambisonic) can be done in the frequency domain. For each complex coefficient c corresponding to a frequency band, knowing the corresponding azimuth a and elevation e, four complex coefficients w, x, y, z corresponding to the same frequency band can be generated using the following formulas:

$$\begin{cases} w = \dfrac{c}{\sqrt{2}} \\ x = c \cdot \cos(a)\cos(e) \\ y = c \cdot \sin(a)\cos(e) \\ z = c \cdot \sin(e) \end{cases} \quad (42)$$

The coefficients w, x, y, z obtained for each frequency band are assembled to respectively generate frequency representations W, X Y and Z of four channels, and the application of the frequency-to-time transform (reverse of that used for the time-to-frequency transform), any clipping, then the overlapping of successive time windows obtained makes it possible to obtain four channels that are a temporal representation in first-order spatial harmonics of the three-dimensional audio signal. A similar approach can be used for transcoding to a format (HOA) of an order greater than or equal to 2, by completing equation (35) with the encoding formulas for the considered order.

LRS mastered surround encoding on two channels can be done in the frequency domain. The elevation being problematic in the mastered surround case, it is only introduced into this example by attenuation of the signal to avoid the position discontinuities for a source going through an elevation of n. For each complex coefficient c corresponding to a frequency band, knowing the corresponding azimuth a normalized in]–π, π] and the elevation e, two complex coefficients l and r corresponding to the same frequency band can be generated using the following formulas:

$$\begin{cases} pos = \frac{3}{2}a + \frac{\pi}{a} \\ l_0 = \cos(e)\sin(pos) \quad \text{if } a \in [-\pi/6, \pi/6] \\ r_0 = \cos(e)\cos(pos) \\ s = 0 \end{cases} \quad (43)$$

$$\begin{cases} pos = \frac{3}{5}a - \frac{\pi}{10} \\ l_0 = \cos(e)\cos(pos) \quad \text{if } a > \pi/6 \\ r_0 = 0 \\ s = \cos(e)\sin(pos) \end{cases} \quad (44)$$

$$\begin{cases} pos = -\frac{3}{5}a - \frac{\pi}{10} \\ l_0 = 0 \quad \text{if } a < -\pi/6 \\ r_0 = \cos(e)\cos(pos) \\ s = \cos(e)\sin(pos) \end{cases} \quad (45)$$

$$\begin{cases} l = l_0 - \frac{i}{\sqrt{2}}s \\ r = r_0 + \frac{i}{\sqrt{2}}s \end{cases} \quad (46)$$

where i is the pure imaginary complex number with square −1. The coefficients l, r obtained for each frequency band are assembled to respectively generate frequency representations L and R of two channels, and the application of the frequency-to-time transform (reverse of that used for the time-to-frequency transform), any clipping, then the overlapping of successive time windows obtained makes it possible to obtain two channels that are a mastered stereo representation of the audio signal.

Y A device and method for capturing, encoding and transcoding an acoustic field, such as a three-dimensional acoustic field, comprising a device made up of two microphones, directional analysis and encoding means of said acoustic field, and optionally means for transcoding said acoustic field. A first microphone with directivity D1 and a second microphone with directivity D2 are positioned in separate locations and with separate orientations. The first microphone transforms the acoustic sound waves that it receives into a first electric signal, which is digitized to yield a first digital audio signal. The second microphone transforms the acoustic sound waves that it receives into a second electric signal, which is digitized to yield a second digital audio signal. A directional analysis system performs, for any frequency from among a plurality of frequencies, a phase measurement for the first and second digital audio signals as well as a panorama measurement for the first and second electric signal, and calculates direction of origin information of the acoustic wave therefrom.

A magnitude and phase determination system performs, for any frequency from among a plurality of frequencies, a determination of the magnitude and phase of said acoustic waves.

Optionally, the direction of origin information and the magnitude and phase of the acoustic wave are, for any frequency from among a plurality of frequencies, projected on an audio panoramic law, allowing the transcoding of the acoustic field in a given audio format.

A computer program comprising the computer code implementing the steps and systems of the method for encoding the acoustic field according to any one of claims 1 to 8, said computer program operating on at least one computer or on at least one processing circuit of the on-board signal.

A computer program comprising the computer code implementing the steps and systems of the means for encoding the acoustic field the steps and systems of the means for transcoding the acoustic field according to claim 8, said computer program operating on at least one computer or on at least one processing circuit of the on-board signal.

The present invention finds many applications in sound engineering, for example:

Three-dimensional (periphonic) sound capture
Surround sound capture
Capture of three-dimensional impulse responses
Capture of surround impulse responses
On-board sound capture in mobile equipment such as smartphone, tablet or video camera, the orientation of microphones can be compensated if it is measured using gyroscopes and magnetometers
Sound capture applied to robotics
Sound capture applied to telecommunications
Sound capture applied to telepresence
Sound capture similar to wearing binaural buttons, with the exception that it involves directional microphones calibrated with the described calibration methods so that the obstruction of the head does not disturb capture

What is claimed is:

1. A method for encoding a three-dimensional acoustic field, comprising:
   encoding an acoustic field captured by microphone buttons of a capture device that comprises a first microphone button with a substantially cardioid directivity and a second microphone button with a substantially cardioid directivity, placed in a Cartesian coordinate system XYZ, the first microphone button and the second microphone button not coinciding and being positioned along axis X on either side of plane YZ and at equal distances from said plane YZ, first and second main axes of said buttons being orthogonal to the axis X and coplanar to one another, the first main axis oriented toward a front of the first microphone button forming an angle $a_{look}$ with the axis X, the second main axis oriented toward a front of the second microphone button forming an angle of $\pi+a_{look}$ with the axis X, by receiving a first signal from the first microphone button and a second signal from the second microphone button,
   (a) performing time-to-frequency transforms of the first signal and the second signal to obtain a first frequency signal and a second frequency signal, (b) receiving said first frequency signal and said second frequency signal and performing, for a frequency from among a plurality of frequencies, a panorama measurement, (c) receiving said first frequency signal and said second frequency signal and performing, for a frequency from among a plurality of frequencies, a phase difference measurement, (d) receiving said panorama measurement from (b) and said phase difference measurement from (c), and determining, for a frequency from among a plurality of frequencies, an azimuth angle and an elevation angle of a direction of origin, (e) receiving said azimuth and elevation angles of (d), and determining, for a frequency from among a plurality of frequencies, a magnitude and a phase.

2. The method for encoding a three-dimensional acoustic field according to claim 1, wherein the angle $a_{look}$ is substantially equal to $\pi/2$.

3. The method for encoding a three-dimensional acoustic field according to claim 1, further comprising for a selected frequency whose wavelength is less than or equal to twice a distance between said microphone buttons, determining one or more additional phase cycles by analyzing locations of frequencies for which the selected frequency is a harmonic.

4. The method for encoding a three-dimensional acoustic field according to claim 1, further comprising for a selected frequency whose wavelength is less than or equal to twice a distance between said microphone buttons, determining a location directly by analysis of locations of frequencies for which the selected frequency is a harmonic.

5. The method for encoding a three-dimensional acoustic field according to claim 1, further comprising transcoding the three-dimensional acoustic field by:

calculating audio panoramic gains by receiving the azimuth angle and the elevation angle of the direction of origin for a frequency from among a plurality of frequencies, and projecting said azimuth and elevation angles according to an audio panoramic law to obtain N panoramic gains, receiving the magnitude, the phase and said N panoramic gains for a frequency from among a plurality of frequencies, and grouping together said magnitude and said phase in a complex coefficient, and multiplying said complex coefficient by said N panoramic gains to obtain N frequency signals, and performing a frequency-to-time inverse transform of said N frequency signals for, to obtain N projected time signals.

6. A method for encoding a three-dimensional acoustic field, comprising:

encoding an acoustic field captured by microphone buttons of a capture device that comprises a first microphone button with a substantially cardioid directivity and a second microphone button with a substantially cardioid directivity, placed in a Cartesian coordinate system XYZ, the first button and the second button not coinciding and being positioned along axis X on either side of plane YZ and at equal distances from said plane YZ, first and second main axes of said buttons being orthogonal to the axis X and coplanar to one another, the first main axis oriented toward a front of the first microphone button forming an angle $a_{look}$ with the axis X and an angle $e_{look}$ with plane XY, the second main axis oriented toward a front of the second microphone button forming an angle of $\pi+a_{look}$ with the axis X and an angle $e_{look}$ with the plane XY, by receiving a first signal from the first microphone button and a second signal from the second microphone button, (a) performing a time-to-frequency transform of the first signal and the second signal to obtain a first frequency signal and a second frequency signal, (b) receiving said first frequency signal and said second frequency signal and performing, for a frequency from among a plurality of frequencies, a panorama measurement, (c) receiving said first frequency signal and said second frequency signal and performing, for a frequency from among a plurality of frequencies, a phase difference measurement, (d) determining the direction of origin by receiving said panorama measurement from (b) and said phase difference measurement from (c), and determining, for a frequency from among a plurality of frequencies, an azimuth angle and an elevation angle of the direction of origin, and (e) receiving said azimuth and elevation angles of (d), and determining, for a frequency from among a plurality of frequencies, a magnitude and a phase.

7. The method for encoding a three-dimensional acoustic field according to claim 6, wherein the angle $a_{look}$ is substantially equal to $\pi/2$, and the angle $e_{look}$ is within an interval $[0, \pi/2]$.

8. The method for encoding a three-dimensional acoustic field according to claim 6 further comprising, for a selected frequency whose wavelength is less than or equal to twice a distance between said microphone buttons analyzing locations of frequencies for which selected frequency is a harmonic to determine a number of additional phase cycles.

9. The method for encoding a three-dimensional acoustic field according to claim 6 further comprising, for a selected frequency whose wavelength is less than or equal to twice a distance between said microphone buttons analyzing locations of frequencies for which the selected frequency is a harmonic to determine a location directly.

10. The method for encoding a three-dimensional acoustic field according to claim 6, further comprising calculating audio panoramic gains based on the azimuth angle and the elevation angle of the direction of origin for a frequency from among a plurality of frequencies, and projecting said azimuth and elevation angles according to an audio panoramic law to obtain N panoramic gains, receiving the magnitude, the phase and said N panoramic gains for any frequency from among a plurality of frequencies, and grouping together said magnitude and said phase in a complex coefficient, and multiplying said complex coefficient by said gains to obtain N frequency signals, and performing a frequency-to-time inverse transform of said N frequency signals for all of the frequencies, to obtain N projected time signals.

11. A method for encoding a three-dimensional acoustic field, comprising:

encoding an acoustic field captured by microphone buttons of a capture device that comprises a first microphone button and a second microphone button, placed in a Cartesian coordinate system XYZ, the first button and the second button not coinciding and being positioned along axis X on either side of plane YZ and at equal distances from said plane YZ, wherein:

the first microphone button has a substantially omnidirectional directivity, the second microphone button has a substantially cardioid directivity,
the first microphone button is situated in plane XY, and a main axis oriented toward a front of the second microphone button is in the plane XY and forms an angle $a_{look} = \pi/2$ with the axis X, by:
receiving a first signal from the first microphone button and a second signal from the second microphone button;
(a) performing time-to-frequency transforms of the first signal and the second signal to obtain a first frequency signal and a second frequency signal,
(b) performing, for a frequency from among a plurality of frequencies, a magnitude ratio measurement of said first and second frequency signals,
(c) performing, for a frequency from among a plurality of frequencies, a phase difference measurement,
(d) receiving said magnitude ratio measurement from (b) and said phase difference measurement from (c), and determining, for a frequency from among a plurality of frequencies, an azimuth angle and an elevation angle of a direction of origin, and
(e) receiving said azimuth and elevation angles of (d), and determining, for a frequency from among a plurality of frequencies, a magnitude and a phase.

12. The method for encoding a three-dimensional acoustic field according to claim 11 further comprising, for a selected frequency whose wavelength is less than or equal to twice a distance between said microphone buttons, determining one or more additional phase cycles by analyzing locations of frequencies for which the selected frequency is a harmonic.

13. The method for encoding a three-dimensional acoustic field according to claim 11 further comprising, for a selected frequency whose wavelength is less than or equal to twice a distance between said microphone buttons, determining a location directly by analysis of locations of frequencies for which the selected frequency is a harmonic.

14. The method for encoding a three-dimensional acoustic field according to claim 11, further comprising
calculating audio panoramic gains based on the azimuth angle and the elevation angle of the direction of origin for a frequency from among a plurality of frequencies, and projecting said azimuth and elevation angles according to an audio panoramic law to obtain N panoramic gains,
receiving the magnitude, the phase and said N panoramic gains for a frequency from among a plurality of frequencies, and grouping together said magnitude and said phase in a complex coefficient, and multiplying said complex coefficient by said N panoramic gains to obtain N frequency signals, and
performing a frequency-to-time inverse transform of said N frequency signals, to obtain N projected time signals.

* * * * *